United States Patent [19]

Meyer et al.

[11] 4,189,589
[45] Feb. 19, 1980

[54] PHENYL-BENZIMIDAZOLYL-FURANES

[75] Inventors: Hans R. Meyer, Binningen; Kurt Weber, Basel, both of Switzerland

[73] Assignee: Ciba-Geigy Corporation, Ardsley, N.Y.

[21] Appl. No.: 876,587

[22] Filed: Feb. 10, 1978

[30] Foreign Application Priority Data

Feb. 22, 1977 [LU] Luxembourg .......................... 76819

[51] Int. Cl.$^2$ ............................................ C07D 405/04
[52] U.S. Cl. ............................ 548/327; 252/301.25; 252/301.26; 252/301.27; 544/116; 544/119; 544/370; 546/199
[58] Field of Search ................ 548/327; 544/116, 119, 544/370; 546/199

[56] References Cited

U.S. PATENT DOCUMENTS

| | | | |
|---|---|---|---|
| 3,497,525 | 2/1970 | Harnisch et al. ..................... | 548/327 |
| 3,637,734 | 1/1972 | Harnisch et al. ..................... | 548/327 |
| 4,018,789 | 4/1977 | Littlewood et al. ................... | 548/327 |

FOREIGN PATENT DOCUMENTS 1436089  5/1976  United Kingdom ..................... 548/327

OTHER PUBLICATIONS

Kada, Coll. Czch. Chem. Commun., vol. 38 (1973), pp. 1700–1704.

*Primary Examiner*—Richard Raymond
*Attorney, Agent, or Firm*—Prabodh I. Almaula

[57] ABSTRACT

2-Phenyl-5-benzimidazol-2'-yl-furanes of the formula

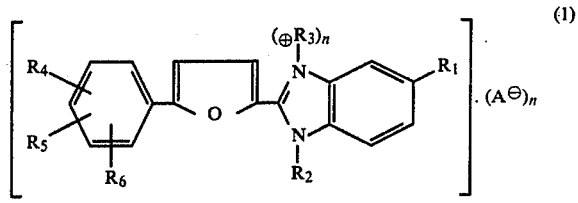

in which $R_1$ is a sulphonic acid group or an ester or amide thereof, a carboxylic acid group or an ester or amide thereof, a cyano group, a trifluoromethyl group or an alkyl- or arylsulphonyl group, $R_2$ is alkyl having 1 to 8 carbon atoms, alkenyl having 3 or 4 carbon atoms, cyclohexyl, hydroxyalkyl having 2 to 4 carbon atoms, alkoxyalkyl having a total of 3 to 6 carbon atoms, carboxyalkyl having 2 to 6 carbon atoms, carbalkoxyalkyl having a total of 3 to 6 carbon atoms, cyanoalkyl having 2 to 4 carbon atoms, carbamoylalkyl which has 1 to 6 carbon atoms in the alkyl moiety and is unsubstituted or substituted on the nitrogen atom by 1 or 2 alkyl having 1 to 3 carbon atoms, benzyl which is unsubstituted or substituted by chlorine, methyl or methoxy, dialkylaminoalkyl having a total of 3 to 7 carbon atoms or phenethyl and, if n is the number 0, also hydrogen, $R_3$ is hydrogen, alkyl having 1 to 6 carbon atoms, hydroxyalkyl having 2 or 3 carbon atoms, cyanoalkyl having 2 to 4 carbon atoms, carboxyalkyl having 2 or 3 carbon atoms, carbamoylmethyl which is unsubstituted or substituted on the nitrogen atom by 1 or 2 alkyl having 1 to 3 carbon atoms, alkoxycarbonylalkyl having a total of 3 to 6 carbon atoms, alkenyl having 3 or 4 carbon atoms or benzyl which is unsubstituted or substituted by chlorine or methyl, $R_4$ is hydrogen, chlorine, bromine, fluorine, carboxyl carbalkoxy having a total of 2 to 5 carbon atoms, alkoxyalkoxycarbonyl having a total of 4 to 6 carbon atoms, benzyloxycarbonyl, cyano, sulpho, alkylsulphonyl having 1 to 4 carbon atoms, carbamoyl or sulphamoyl which are unsubstituted or substituted by 1 or 2 alkyl groups having 1 to 4 carbon atoms, or sulphonic acid phenyl ester or trifluoromethyl, $R_5$ is hydrogen, chlorine or methyl, $R_6$ is hydrogen or chlorine, n is the number 0 or 1 and $A^\ominus$ is a colorless anion equivalent to the cation of the fluorescent brightener, their preparation as well as their use for optically brightening organic materials are disclosed.

18 Claims, No Drawings

PHENYL-BENZIMIDAZOLYL-FURANES

The present invention relates to novel phenylbenzimidazolyl-furanes, processes for their preparation and their use for optically brightening organic material.

2-Aryl-5-benzimidazol-2'-yl-furanes and their use as fluorescent brightening agents are known from German Offenlegungsschriften 1,469,227, 1,545,846, 1,594,841 and 2,346,316 and from Coll. Czech. Chem. Commens 38, 1700–1704 (1973).

It has now been found that 2-phenyl-5-benzimidazol-2'-yl-furanes which are substituted in a specific way surprisingly have better properties and produce better effects.

The novel 2-phenyl-5-benzimidazol-2'-yl-furanes are of the formula

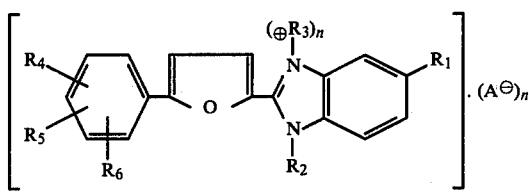

in which $R_1$ is a sulphonic acid group or an ester or amide thereof, a carboxylic acid group or an ester or amide thereof, a cyano group, a trifluoromethyl group or an alkyl- or arylsulphonyl group, $R_2$ is alkyl having 1 to 8 carbon atoms, alkenyl having 3 or 4 carbon atoms, cyclohexyl, hydroxyalkyl having 2 to 4 carbon atoms, alkoxyalkyl having a total of 3 to 6 carbon atoms, carboxyalkyl having 2 to 6 carbon atoms, carbalkoxyalkyl having a total of 3 to 6 carbon atoms, cyanoalkyl having 2 to 4 carbon atoms, carbamoylalkyl which has 1 to 6 carbon atoms in the alkyl moiety and is unsubstituted or substituted on the nitrogen atom by 1 or 2 alkyl having 1 to 3 carbon atoms, benzyl which is unsubstituted or substituted by chlorine, methyl or methoxy, dialkylaminoalkyl having a total of 3 to 7 carbon atoms or phenethyl and, if n is the number 0, also hydrogen, $R_3$ is hydrogen, alkyl having 1 to 6 carbon atoms, hydroxyalkyl having 2 or 3 carbon atoms, cyanoalkyl having 2 to 4 carbon atoms, carboxyalkyl having 2 or 3 carbon atoms, carbamoylmethyl which is unsubstituted or substituted on the nitrogen atom by 1 or 2 alkyl having 1 to 3 carbon atoms, alkoxycarbonylalkyl having a total of 3 to 6 carbon atoms, alkenyl having 3 or 4 carbon atoms or benzyl which is unsubstituted or substituted by chlorine or methyl, $R_4$ is hydrogen, chlorine, bromine, fluorine, carboxyl, carbalkoxy having a total of 2 to 5 carbon atoms, alkoxyalkoxycarbonyl having a total of 4 to 6 carbon atoms, benzyloxycarbonyl, cyano, sulpho, alkylsulphonyl having 1 to 4 carbon atoms, carbamoyl or sulphamoyl which are unsubstituted or substituted by 1 or 2 alkyl groups having 1 to 4 carbon atoms, or sulphonic acid phenyl ester or trifluoromethyl, $R_5$ is hydrogen, chlorine or methyl, $R_6$ is hydrogen or chlorine, n is the number 0 or 1 and $A^\ominus$ is a colourless anion equivalent to the cation of the fluorescent brightener.

A "sulphonic acid group" is to be understood as meaning the radical $—SO_3M$ in which M is hydrogen or a salt-forming cation. Possible salt-forming cations M are in general those of alkaline earth metals, for example of calcium, barium or magnesium, and especially of alkali metals, for example of sodium or potassium, but also ammonium, which is unsubstituted or substituted by alkyl or hydroxyalkyl having 1 to 4 carbon atoms, or amine salt ions of cyclic amines, such as pyridine, morpholine or piperidine. In addition to hydrogen, M is preferably in particular the potassium cation or the sodium cation.

In compounds of the formula (1) in which $R_1$ or $R_4$ is the group $—SO_3H$, the strongly acid sulpho group can form an inner salt with the basic imidazole ring.

"Sulphonic acid esters" and "carboxylic acid esters" $R_1$ are to be understood as meaning those which are formed from aliphatic or mononuclear alicyclic alcohols and from phenols, preferably phenol. Preferred alcohols are branched and non-branched saturated alcohols having 1 to 8 carbon atoms, glycol monoalkyl ethers having 3 to 8 carbon atoms, glycol monophenyl ether, phenylalkyl alcohols having 1 to 3 carbon atoms in the alkyl moiety, halogenoalkanols, preferably chloroalkanols, having 1 to 4 carbon atoms, cyclohexanol, unsaturated alcohols having 3 to 6 carbon atoms, glycollic acid, glycollic acid esters having 3 to 8 carbon atoms and glycollic acid nitrile.

Preferred phenols are those of the formula

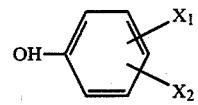

in which $X_1$ is hydrogen, alkyl having 1 to 8 carbon atoms, halogen, preferably chlorine, alkoxy having 1 to 4 carbon atoms, carboxyl, carbalkoxy having 2 to 5 carbon atoms, phenyl or cyanoethyl, $X_2$ is hydrogen, alkyl having 1 to 4 carbon atoms, chlorine or methoxy and $X_1$ and $X_2$ together are the radical of a fused benzene or pyridine radical.

Examples of such phenols are phenol, o-, m- and p-cresol, o-, m- and p-chlorophenol, o-, m- and p-methoxy-phenol, 2-ethoxyphenol, 2,4-dimethylphenol, 2-sec.-butylphenol, 4-sec.-butylphenol, 2-tert.-butylphenol, 4-tert.-butylphenol, 4-ethylphenol, 2-isopropylphenol, 5-isopropyl-2-methylphenol, 4-tert.-octylphenol, 2,4-dichlorophenol, 4-chloro-o-cresol, 4-chloro-5-methoxyphenol, salicylic acid, methyl salicylate, 4-hydroxybenzoic acid, ethyl 4-hydroxybenzoate, butyl 4-hydroxybenzoate, methyl 3-hydroxybenzoate, 4-hydroxybenzonitrile, 2-hydroxybiphenyl, 4-hydroxybiphenyl, vanillinic acid, o-cresotinic acid, m-cresotinic acid, 3-(4-hydroxyphenyl)-propionitrile, 3-(4-hydroxyphenyl)-propionic acid, naphthol and 8-hydroxyquinoline.

Alkylsulphonyl is to be understood as meaning, preferably, a group having 1 to 4 carbon atoms which can also be substituted by phenyl, chlorophenyl, chlorine or alkoxy having 1 to 4 carbon atoms. Arylsulphonyl groups are preferably phenylsulphonyl groups, which are unsubstituted or can be substituted by halogen, especially chlorine, or alkyl having 1 to 4, preferably 1, carbon atoms.

The colourless anions $A^\ominus$ are those of organic or inorganic acids which, corresponding to their valency, are able to form monovalent or polyvalent salts with the basic benzimidazole. Examples are: aliphatic monocarboxylic acids having 1 to 18 carbon atoms, which can also be substituted by 1 to 5 hydroxyl groups or keto groups, for example onic and uronic acids, aromatic carboxylic acids (substituted or unsubstituted benzoic acids), aliphatic di-, tri- and tetracarboxylic acids having 1 to 6 carbon atoms, which preferably can be substituted by 1 to 4 hydroxyl groups (for example saccharic acid), carbonic acid, hydrogen halide acids, sulphuric acid, monoalkyl esters of sulphuric acid having 1 to 4 carbon atoms, arylsulphonic acids (substituted or unsubstituted benzenesulphonic acid), alkylsulphonic acids (for example methanesulphonic acid), phosphoric acid, phosphorous acid, nitric acid and the like.

As a rule, the anion is introduced by quaternisation. Accordingly, the preferred anions are primarily the anions of the quaternising agents used, such as esters of $C_1$-$C_4$ alcohols with sulphuric acid, benzenesulphonic acid, toluenesulphonic acid, chlorobenzenesulphonic acid, hydrochloric acid and hydrobromic acid.

If desired, however, the anion can also be replaced by another anion by known methods (c.f., for example, Houben-Weyl, Methoden der organischen Chemie (Methods of Organic Chemistry), Volume XI/2, pages 620–626). Preferred anions in this case are those of formic acid, acetic acid, propionic acid, glycollic acid, lactic acid, malic acid, tartaric acid, mucic acid, gluconic acid, citric acid and laevulinic acid.

2-Phenyl-5-benzimidazol-2'-yl-furanes of particular interest are those of the formula

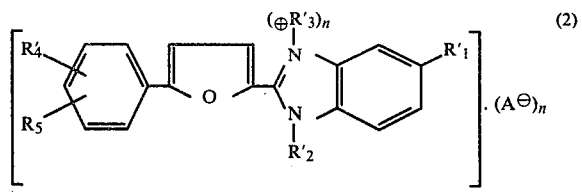

in which $R_1'$ is a sulphonic acid group, a sulphonic acid alkyl ester having 1 to 8 carbon atoms, a sulphonic acid cyclohexyl ester, a sulphonic acid alkoxyalkyl ester having a total of 2 to 8 carbon atoms, a sulphonic acid phenoxyalkyl ester or phenylalkyl ester having 1 to 3 carbon atoms in the alkyl moiety, a sulphonic acid chloroalkyl ester having 1 to 4 carbon atoms, a sulphonic acid alkenyl ester having 3 or 4 carbon atoms, alkylsulphonyl having 1 to 4 carbon atoms, benzylsulphonyl, phenylsulphonyl which is unsubstituted or substituted by methyl or chlorine, cyano, trifluoromethyl or —$COOY_1$, —$SO_2NY_1Y_2$ or —$CONY_1Y_2$, in which $Y_1$ is hydrogen, alkyl having 1 to 8 carbon atoms, alkenyl having 3 or 4 carbon atoms, cyclohexyl, hydroxyalkyl having 2 to 4 carbon atoms, alkoxyalkyl having a total of 3 to 6 carbon atoms, carboxyalkyl having 2 to 6 carbon atoms, carbalkoxyalkyl having a total of 3 to 6 carbon atoms, cyanoalkyl having 2 to 4 carbon atoms, benzyl which is unsubstituted or substituted by chlorine, methyl or methoxy, phenyl which is unsubstituted or substituted by chlorine, methyl or methoxy, dialkylaminoalkyl having a total of 3 to 7 carbon atoms, N-cyano-ethyl-N-alkylaminoalkyl having a total of 7 to 10 carbon atoms, N-morpholino-, N-piperidino- or N-pyrrolidino-alkyl having 2 or 3 carbon atoms in the alkyl moiety, which can be quaternised or protonated by $R_3$, or phenethyl and $Y_2$ is hydrogen, alkyl having 1 to 4 carbon atoms, alkenyl having 3 or 4 carbon atoms or hydroxyalkyl having 2 to 4 carbon atoms, and $Y_1$ and $Y_2$ together with the nitrogen atom are a piperidine ring, pyrrolidine ring or N-alkylpiperazine ring having 1 to 3 carbon atoms in the alkyl moiety, or a morpholine ring which is unsubstituted or substituted by 1 or 2 methyl groups, or the grouping

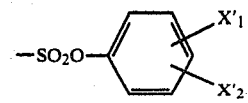

in which $X_1'$ is hydrogen, alkyl having 1 to 4 carbon atoms, chlorine, alkoxy having 1 to 4 carbon atoms, carboxyl, carbalkoxy having 2 to 5 carbon atoms or phenyl and $X_2'$ is hydrogen, methyl, methoxy or chlorine, $R_2'$ is alkyl having 1 to 8 carbon atoms, alkenyl having 3 or 4 carbon atoms, carbamoylalkyl having a total of 2 to 6 carbon atoms, hydroxyalkyl having 2 to 4 carbon atoms, alkoxyalkyl having a total of 3 to 6 carbon atoms, carboxyalkyl having 2 to 6 carbon atoms, carbalkoxyalkyl having a total of 3 to 6 carbon atoms, cyanoalkyl having 2 to 4 carbon atoms, benzyl which is unsubstituted or substituted by chlorine, methyl or methoxy, dialkylaminoalkyl having a total of 3 to 7 carbon atoms or phenethyl and, if n is the number 0, also hydrogen, $R_3'$ is hydrogen, alkyl having 1 to 6 carbon atoms, hydroxyalkyl having 2 or 3 carbon atoms, cyanoalkyl having 2 to 4 carbon atoms, carboxymethyl, carbamoylmethyl, alkoxycarbonylmethyl having a total of 3 to 6 carbon atoms, alkenyl having 3 or 4 carbon atoms or benzyl which is unsubstituted or substituted by chlorine or methyl, $R_4'$ is hydrogen, chlorine, bromine, fluorine, carboxyl, carbalkoxy having a total of 2 to 5 carbon atoms, alkoxyalkoxycarbonyl having a total of 4 to 6 carbon atoms, benzyloxycarbonyl, cyano, sulpho, alkylsulphonyl having 1 to 4 carbon atoms, carbamoyl or sulphamoyl which are unsubstituted or substituted by alkyl having 1 to 4 carbon atoms, or sulphonic acid phenyl ester or trifluoromethyl, $R_5$ is hydrogen, chlorine or methyl, n is the number 0 or 1 and $A^\ominus$ is a colourless anion equivalent to the cation of the fluorescent brightener.

Preferred 2-phenyl-5-benzimidazol-2'-yl-furanes of the formula (2) are those of the formula

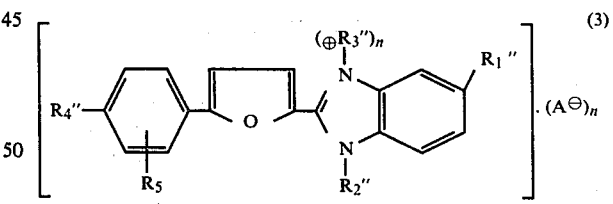

in which $R_1''$ is alkylsulphonyl having 1 to 4 carbon atoms, phenylsulphonyl, benzylsulphonyl, trifluoromethyl, cyano or —$CONY_1'Y_2'$ or —$SO_2NY_1'Y_2'$, in which $Y_1'$ is hydrogen, alkyl having 1 to 4 carbon atoms, alkenyl having 3 or 4 carbon atoms, hydroxyalkyl having 2 to 4 carbon atoms, cyclohexyl, alkoxyalkyl having a total of 3 to 6 carbon atoms, benzyl or dialkylaminoalkyl having a total of 3 to 7 carbon atoms, which can be quaternised or protonated by $R_3''$, and $Y_2'$ is hydrogen, alkyl having 1 to 3 carbon atoms or alkenyl having 3 or 4 carbon atoms, and $Y_1'$ and $Y_2'$ together with the nitrogen atom are a piperidine ring, a N-alkylpiperazine ring having 1 to 3 carbon atoms in the alkyl moiety or a morpholine ring, or a sulphonic acid alkyl ester having 1 to 4 carbon atoms which is unsubstituted or substituted by alkoxy having 1 to 4 carbon atoms, or the grouping

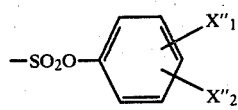

in which $X_1''$ is hydrogen, alkyl having 1 to 4 carbon atoms, chlorine, methoxy, carboxyl, carbalkoxy having 2 to 5 carbon atoms or phenyl and $X_2''$ is hydrogen, methyl or chlorine, $R_2''$ is alkyl having 1 to 4 carbon atoms, alkenyl having 3 or 4 carbon atoms, cyanoalkyl having 2 to 4 carbon atoms, carbalkoxyalkyl having a total of 3 to 6 carbon atoms, carbamoylmethyl, carboxymethyl or benzyl and, if n is the number 0, also hydrogen, $R_3''$ is hydrogen, alkyl having 1 to 4 carbon atoms, hydroxyalkyl having 2 or 3 carbon atoms, alkenyl having 3 or 4 carbon atoms, cyanoalkyl having 2 to 4 carbon atoms, alkoxycarbonylalkyl having a total of 3 to 6 carbon atoms, carbamoylmethyl or benzyl, $R_4''$ is hydrogen, chlorine, carbalkoxy having 2 to 5 carbon atoms or carbamoyl which is unsubstituted or substituted by alkyl having 1 to 4 carbon atoms, $R_5$ is hydrogen, chlorine or methyl, n is the number 0 or 1 and $A^\ominus$ is a colourless anion equivalent to the cation of the fluorescent brightener, and also the compounds of the formula

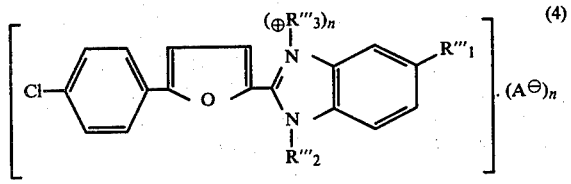

in which $R_1'''$ is a sulphonic acid alkoxyalkyl ester having a total of 2 to 6 carbon atoms, a sulphonic acid alkyl ester having 1 to 4 carbon atoms, alkylsulphonyl having 1 to 4 carbon atoms, phenylsulphonyl, cyano or —CONY$_1''$Y$_2''$ or —SO$_2$NY$_1''$Y$_2''$, in which $Y_1''$ is hydrogen, alkyl having 1 to 4 carbon atoms, alkenyl having 3 or 4 carbon atoms, hydroxyalkyl having 2 to 4 carbon atoms, alkoxyalkyl having a total of 3 to 6 carbon atoms, benzyl or dialkylaminoalkyl having a total of 3 to 7 carbon atoms, which can be quaternised or protonated by $R_3'''$, and $Y_2''$ is hydrogen or alkyl having 1 to 3 carbon atoms, and $Y_1''$ and $Y_2''$ together with the nitrogen atom are a morpholine ring, or the grouping

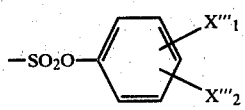

in which $X_1'''$ is hydrogen, alkyl having 1 to 4 carbon atoms, chlorine or methoxy and $X_2'''$ is hydrogen, methyl or chlorine, $R_2'''$ and $R_3'''$ independently of one another are alkyl having 1 to 4 carbon atoms, cyanoalkyl having 2 to 4 carbon atoms, alkoxycarbonylmethyl having 1 to 3 carbon atoms in the alkyl moiety, carbamoylmethyl or benzyl, n is the number 0 or 1 and $A^\ominus$ is a colourless anion equivalent to the cation of the fluorescent brightener.

In compounds of the formulae (1), (3) and (4), $Y_2$, $Y_2'$ and $Y_2''$ respectively are preferably hydrogen.

In compounds of the formula (3), $R_5$ is preferably hydrogen or methyl.

Particularly preferred compounds of the formula (2) are those of the formula

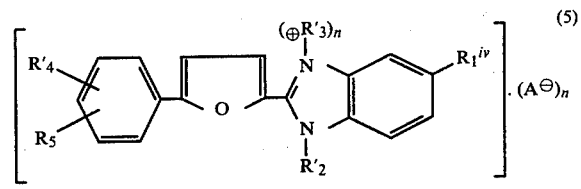

in which $R_1'^{iv}$ is a sulphonic acid alkyl ester having 1 to 8 carbon atoms, a sulphonic acid cyclohexyl ester, a sulphonic acid alkoxyalkyl ester having a total of 2 to 8 carbon atoms, a sulphonic acid phenoxyalkyl ester or sulphonic acid phenylalkyl ester having 1 to 3 carbon atoms in the alkoxy or alkyl moiety, a sulphonic acid chloroalkyl ester having 1 to 4 carbon atoms, a sulphonic acid alkenyl ester having 3 or 4 carbon atoms, trifluoromethyl or the grouping

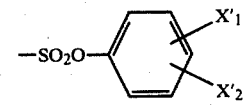

and $R_2'$, $R_3'$, $R_4'$, $R_5$, $X_1'$, $X_2'$, n and $A^\ominus$ are as defined under formula (2).

Compounds of particular interest are those of the formula

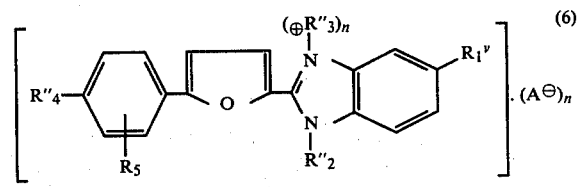

in which $R_1^v$ is a sulphonic acid alkyl ester having 1 to 4 carbon atoms which is unsubstituted or substituted by alkoxy having 1 to 4 carbon atoms, or trifluoromethyl or the grouping

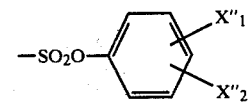

and $R_2''$, $R_3''$, $R_4''$, $R_5$, $X_1''$, $X_2''$, n and $A^\ominus$ are as defined under formula (3), and especially compounds of the formula

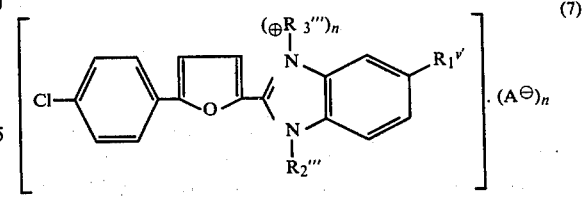

in which $R_1{}^{iv}$ is a sulphonic acid alkyl ester having 1 to 4 carbon atoms which is unsubstituted or substituted by alkoxy having 1 or 2 carbon atoms, or trifluoromethyl or the grouping

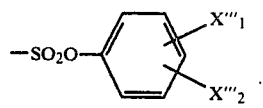

and $R_2'''$, $R_3'''$, $X_1''''$, $X_2''''$, n and $A^\ominus$ are as defined under formula (4).

2-Phenyl-5-benzimidazol-2'-yl-furanes of the formula (2) which are of particular interest are those of the formula

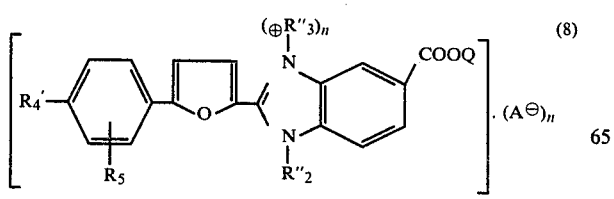

(8)

in which Q is hydrogen, alkyl having 1 to 4 carbon atoms, phenyl, cyclohexyl, alkenyl having 3 to 4 carbon atoms, alkoxyalkyl having a total of 3 to 6 carbon atoms, benzyl or dialkylaminoalkyl having a total of 3 to 7 carbon atoms, which can be quaternised or protonated by $R_3''$, and $R_2''$, $R_3''$, $R_4'$, $R_5$, n and $A^\ominus$ are as defined further above, and also the compounds of the formula

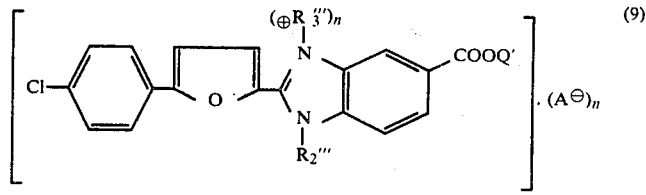

(9)

in which Q' is hydrogen or alkyl having 1 to 4 carbon atoms and $R_2'''$, $R_3'''$, n and $A^\ominus$ are as defined under formula (4).

Preferred compounds are those of the formulae (1) to (9) in which n is the number 1 and especially the compounds of the formulae

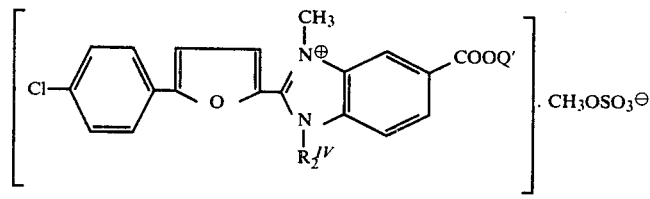

in which Q' is hydrogen or alkyl having 1 to 4 carbon atoms and $R_2'^v$ is methyl or benzyl,

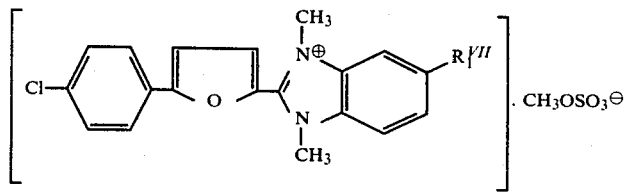

in which $R_1{}^{v''}$ is methylsulphonyl, phenylsulphonyl or cyano,

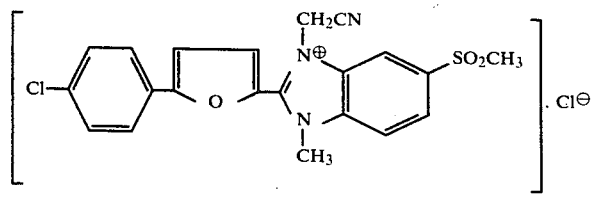

and

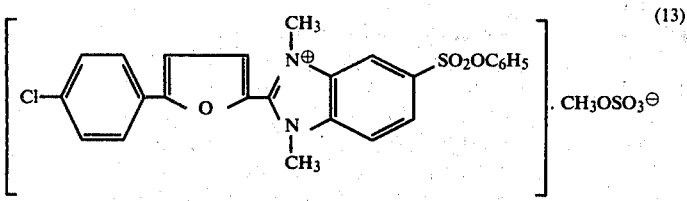 (13)

The compounds of the formula (1) are obtainable by various processes, thus, for example, by subjecting a compound of the formula

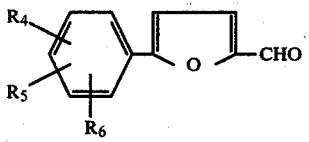 (14)

in which $R_4$, $R_5$ and $R_6$ are as defined under formula (1), to a condensation reaction with an o-phenylenediamine of the formula

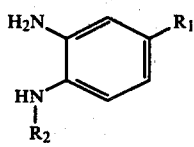 (15)

in which $R_1$ and $R_2$ are as defined under formula (1), to give azomethines of the formula

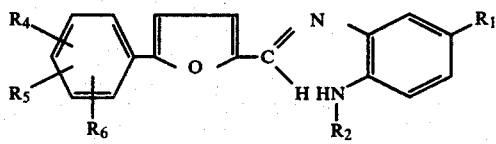 (16)

and then oxidising or dehydrogenating the latter to the corresponding 2-phenyl-5-benzimidazol-2'-yl-furanes of the formula (1) in which n is the number 0 and, if desired, quaternising the latter with an alkylating agent to give compounds of the formula (1) in which n is the number 1.

The condensation reaction of compounds of the formula (14) with those of the formula (15) to give compounds of the formula (16) is advantageously carried out at a temperature between 0 and 60° C., preferably at 10° to 30° C. In general it is advisable to carry out the condensation reaction in a solvent and diluent, such as methanol, ethanol, acetone, acetonitrile, glacial acetic acid, ethyl acetate, dioxane, tetrahydrofurane, dimethylformamide, benzene, toluene, xylene, chlorobenzene, o-dichlorobenzene, chloroform or carbon tetrachloride.

The conversion of the azomethines of the formula (16) to the corresponding benzimidazole compounds of the formula (1) is effected by methods known per se, using oxidants, for example oxygen and preferably atmospheric oxygen, in the presence of oxygen-transfer catalysts such as cobalt naphthenates or conventional heavy metal complex catalysts, such as are described in German Offenlegungsschrift No. 2,138,931, manganese dioxide, copper-II acetate, lead tetraacetate, sodium hypochlorite, chloranil or nitrobenzene, and can be carried out in a solvent which is inert towards the particular oxidant such as methanol, ethanol, acetone, glacial acetic acid, dioxane, tetrahydrofurane, dimethylformamide, benzene, toluene, xylene, chlorobenzene, o-dichlorobenzene, chloroform, carbon tetrachloride and pyridine. The reaction is carried out at a temperature between 15° C. and the boiling point of the solvent used, preferably between 20° and 30° C.

According to a modification of this process, compounds of the formula (1) can also be obtained by reacting compounds of the formula (14) with those of the formula (15) in the presence either of copper-II salts as oxidants (c.f. Elderfield, Heterocyclic Compounds, Volume 5, 283) or preferably of dithionites or especially bisulphites or the anhydrides thereof, such as alkali metal dithionites, alkali metal bisulphites or alkali metal metabisulphites.

In this case the reaction is advantageously carried out using a concentrated aqueous solution of at least 1 mol of sodium bisulphite or at least ½ mol of sodium dithionite, and preferably 1 to 3 mols of sodium bisulphite per mol of starting material (14) and (15), and also, if desired, an inert organic solvent, at temperatures between 60° and 120° C. and preferably at the reflux temperature. Suitable inert organic solvents are those listed above, especially those which are partially or wholly miscible with water, for example ethanol, n-propanol, n-butanol, dioxane, ethyl acetate, dimethylformamide, ethylene glycol monomethyl ether or cyclohexanone.

Compounds of the formula (1) in which n is the number 0 can also be obtained by reacting those compounds in which $R_2$ is hydrogen with alkylating agents in the presence of basic compounds, by known methods.

The formation of the acid addition products or quaternary ammonium salts, especially the reaction of compounds of the formula (1) in which n is the number 0 with a protonating or quaternising agent of the formula $R_3$—A in which $R_3$ is as defined above and A is the radical which is converted into the anion $A^\ominus$ during the quaternisation, can be carried out in a conventional manner, preferably in a solvent, and advantageously at least one mol equivalent of the protonating or quaternising agent is employed.

If it is desired to prepare compounds of the formula (1) in which $R_2$ is not hydrogen and which are quaternised with alkyl radicals, the alkylation is preferably carried out with dialkyl sulphates, such as dimethyl sulphate and diethyl sulphate, alkyl halides, such as methyl chloride, ethyl iodide or bromide, propyl iodide or bromide and butyl iodide or bromide, allyl chloride or bromide or crotyl chloride or bromide, or alkylbenzenesulphonates, such as a p-methyl-, ethyl- or chlorobenzenesulphonate. if it is desired to prepare compounds of the formula (1) in which $R_2$ is not hydrogen and which are quaternised by a benzyl radical, the benzylation is preferably carried out with benzyl halides, such as benzyl chloride. Examples of further quaternising agents are $BrCH_2CH_2OH$, $BrCH_2CHOHCH_3$ and especially halogenoacetic acid derivatives, such as $ClCH_2CO_2CH_2CH_3$, $BrCH_2COOH$, $BrCH_2COOCH_3$, $ClCH_2CN$, $ClCH_2CONH_2$, $ClCH_2CONHCH_3$ and $ClCH_2CON(CH_3)_2$, and also ethylene oxide or propylene oxide in the presence of suitable anions, such as, for example, those of formic acid, acetic acid or lactic acid.

It if is desired to prepare protonated compounds of the formula (1), i.e. acid addition salts thereof, the protonation is carried out in particular with mineral acids. Suitable acids are, in principle, all strong to medium-strength organic acids or mineral acids, it being possible to exchange the anions by double decomposition.

Suitable solvents in which the protonation or quaternisation can be carried out are in general all inert solvents. Preferred solvents are those which dissolve the starting material and from which the end product separates out immediately. Examples are: aromatic hydrocarbons, such as benzene, toluene and xylene; halogenated hydrocarbons, such as trichloroethane, tetrachloroethylene, chlorobenzene or dichlorobenzene, and also nitro compounds, such as nitromethane, nitropropane and nitrobenzene, alkanols and open-chain or cyclic ethers, such as butanol, dibutyl ether, ethylene glycol, ethylene glycol monomethyl ether, ethylene glycol monoethyl ether, anisole or dioxane; ketones, such as cyclohexanone or methyl ethyl ketone; fatty acid amides, such as dimethylformamide or dimethylacetamide; sulphoxides, such as dimethylsulphoxide, and carboxylic acid esters, such as ethyl acetate or butyl acetate. The reaction is carried out, for example, at temperatures of 60° to 180° C. and preferably of 90° C. to 140° C. In some cases it is also advantageous to use excess alkylating agent as the solvent.

Compounds of the formula (1) in which n is the number 0 and which have a sufficiently basic nitrogen atom in the radical $R_1$ can be quaternised on this nitrogen atom in the side chain, without the benzimidazole ring also being quaternised. Such compounds have the formula

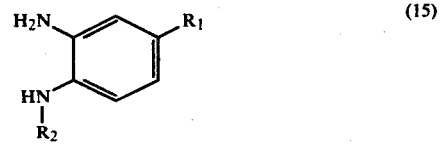

in which $R_1^{x1}$ is $SO_2NZ_1Z_2$, $CONZ_1Z_2$ or $COOZ_1$, in which $Z_1$ is N,N'-dialkylaminoalkyl having a total of 3 to 7 carbon atoms or a N-morpholinoalkyl, N-piperidinoalkyl or N-pyrrolidinoalkyl radical, each having 2 to 3 carbon atoms in the alkyl moiety, and $Z_2$ is hydrogen, alkyl having 1 to 4 carbon atoms, hydroxyalkyl having 2 to 4 carbon atoms or cyanoalkyl having 2 to 3 carbon atoms, and $Z_1$ and $Z_2$ together with the nitrogen atom are a N-alkylpiperazine or N-hydroxyalkylpiperazine ring having 1 to 4 carbon atoms in the alkyl moiety, and $R_2$, $R_4$, $R_5$ and $R_6$ are as defined above. Compounds in which $Z_2$ is hydrogen are preferred.

The quaternisation is generally carried out with the same alkylating agents $R_3$–A which are used for the quaternisation of the benzimidazole ring. However, advantageously somewhat milder reaction conditions are maintained, i.e. lower temperatures of about 50° to 100° C. and the stoichiometric amount or only a slight excess of the alkylating agent.

If, however, it is desired to obtain di-quaternised compounds, at least 2 mols of the alkylating agent $R_3$–A are used per mol of the compound of the formula (17) and in other respects the reaction is carried out under reaction conditions the same as those under which the benzimidazole ring is quaternised.

Compounds of the formula (1) can also be prepared by subjecting a furane-5-carboxylic acid of the formula

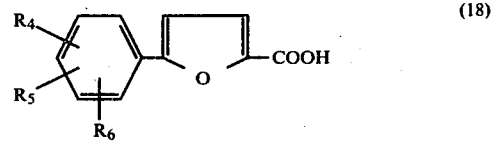

or a functional derivative thereof, in which $R_4$, $R_5$ and $R_6$ are as defined under formula (1), to a condensation reaction with an o-phenylenediamine of the formula

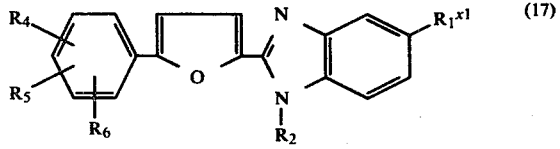

in which $R_1$ and $R_2$ are as defined under formula (1), advantageously in the presence of catalysts, for example acetic acid, hydrogen chloride, boric acid, zinc chloride, polyphosphoric acid or p-toluenesulphonic acid, and quaternising the compounds of the formula (1) in which n is the number 0, which are thus obtained, by reaction with an alkylating agent in the manner indicated above. Functional derivatives of the carboxylic acid are to be understood as meaning the salts, halides, esters, amides, imino-ethers and nitriles thereof.

The compounds of the formula (1) can also be prepared by acylating a correspondingly substituted o-nitroaniline with correspondingly substituted 2-phenylfurane-5-carboxylic acid or a functional derivative thereof, reducing the nitro group, preferably in an acid medium, for example with stannous chloride, and at the same time effecting cyclisation to give the imidazole ring.

The starting materials of the formula (15) are generally prepared in a manner known per se, by reacting 4-chloro-3-nitrobenzene derivatives with primary amines or ammonia to give the correspondingly substituted o-nitroanilines and reducing the latter, for example by means of catalytic hydrogenation (c.f. Belgian Patent Specification No. 595,327, German Offenlegungsschrift No. 2,239,614 and German Offenlegungsschrift No. 1,522,412). The reduction of o-nitroanilines having substituents which are readily hydrogenated catalytically, for example allyl groups, is better carried out with sodium hydrosulphide or iron (Bechamp method).

The compounds of the formula (15) are, for example, those in which $R_1$ and $R_2$ are as defined below: $R_1$: Carbamoyl, sulphamoyl or methyl-, ethyl-, n-propyl-, isopropyl-, n-butyl, isobutyl-, sec.-butyl-, octyl-, hydroxy-ethyl-, γ-hydroxypropyl-, methoxyethyl-, isopropoxypropyl-, β-hydroxypropyl-, 3-butoxy-1-propyl-, 3-methoxypropyl-, 3-ethoxypropyl-, α, α-dimethyl-β- hydroxyethyl-, α, α-(dihydroxy-methyl)-ethyl-, carboxymethyl-, β-carboxyethyl-, ω-carboxy-pentyl-, ethoxycarbonylmethyl-, β-cyanoethyl-, phenyl-, o- and p-methoxyphenyl-, o-chlorophenyl-, benzyl-, phenethyl-, p-methylbenzyl-, cyclohexyl-, allyl-, dimethylaminopropyl-, diethylaminoethyl-, 2-(N-morpholinoethyl)-, 2-(N-pyrrolidino-ethyl)-, or diethylaminopropyl-carbamoyl or -sulphamoyl; dimethyl-, diethyl-, dihydroxyethyl-, N-methyl-N-phenyl-, N-ethyl-N-phenyl-, N-methyl-N-(β-hydroxy-ethyl)-, N-ethyl-N-(β-hydroxyethyl)-, N-n-propyl-N-hydroxy-methyl- or diallyl-carbamoyl or -sulphamoyl; morpholino-, 3,5-dimethylmorpholino-, pyrrolidino-, piperidino-, 2-ethylpiperidino-, N-methylpiperazino- or N-(β-hydroxyalkyl)-piperazino-carbonyl or -sulphonyl; sulpho, sodium sulphonate, phenyl sulphonate, o-methylphenyl sulphonate, m-methylphenyl sulphonate, p-tolylsulphonate, o- and p-chlorophenyl sulphonate, o-methoxyphenyl sulphonate, 2,4-dimethylphenyl sulphonate, p-tert.-butylphenyl sulphonate, 2-isopropyl-5-methylphenyl sulphonate, methylsulphonyl, ethylsulphonyl, propylsulphonyl, butylsulphonyl, benzylsulphonyl, tosyl, p-chlorophenylsulphonyl, cyano or trifluoromethyl. $R_2$: Hydrogen, methyl, ethyl, isopropyl, n-propyl, n-butyl, sec.-butyl, isobutyl, octyl, hydroxyethyl, β-hydroxypropyl, β-hydroxypropyl, methoxyethyl, isopropoxypropyl, α, α-dimethyl-β-hydroxyethyl, α, α-(dihydroxymethyl)-ethyl, carboxymethyl, β-carboxyethyl, ω-carboxypentyl, ethoxycarbonylmethyl, cyanoethyl, benzyl, phenethyl, p-methylbenzyl, cyclohexyl, allyl, dimethylaminopropyl, diethylaminoethyl, diethylaminopropyl or carbamoylmethyl.

The compounds of the formula (14) are obtained by reacting diazotised anilines with furfurol in the presence of copper-I chloride (CA 48 (1954) 1935 and U.S. Pat. No. 3,856,825). The compounds of the formula (18) are obtained analogously from diazotised anilines and furane-2-carboxylic acid (Collect, Czech. Chem. Commun. 39 (1974) 767–72, 1892–97)or by oxidising 2-phenylfurane-5-aldehydes.

Examples of compounds of the formulae (14) and (18) are those of the formulae

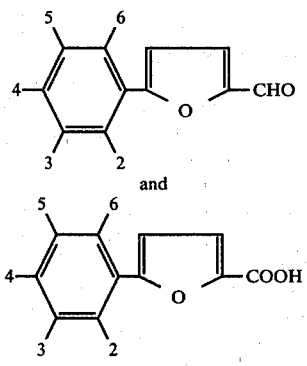

which can be substituted as indicated below: 2-chloro, 3-chloro, 4-chloro, 2,4-dichloro, 2,5-dichloro, 2,3-dichloro, 3-chloro-4,6-disulphonamido, 3-chloro-4,6-disulpho, 2-bromo, 4-bromo, 2-carboxy, 3-carboxy, 4-carboxy, 4-(carboxylic acid methyl ester), 4-(carboxylic acid ethyl ester), 4-(carboxylic acid benzyl ester), 4-(carboxylic acid methoxyethyl ester), 4-(carboxylic acid butyl ester), 2-cyano, 3-cyano, 4-cyano, 2-(carboxylic acid methyl ester), 2-carboxamido, 3-carboxamido, 4-carboxamido, 2-sulpho, 3-sulpho, 4-sulpho, 3-sulphonamido, 4-ethylsulphonamido, 4-chloro-2-cyano, 4-sulphonamido, 4-dimethylsulphonamido, 2-(sulphonic acid phenyl ester), 4-(sulphonic acid phenyl ester), 2-methylsulphonyl, 4-methylsulphonyl, 2-phenylsulphonyl, 4-phenylsulphonyl, 2,4-di-(methylsulphonyl), 2-carboxyl-5-sulphonamido, 2-sulpho-4-methyl, 2-carboxyl-4-methyl, 2-carboxy-5-methyl, 3-carboxy-5-sulpho, 2-methyl-4-sulpho, 4-chloro-3-carboxy, 2-chloro-4-methylsulphonyl, 2-methyl-3-chloro, 2-methyl-5-chloro, 3-chloro-4-methyl, 2-methyl-4-chloro, 2-methyl-3-carbomethoxy, 3-sulpho-4-chloro, 2-chloro-5-sulpho, 2-sulpho-4-chloro, 3,4-dichloro-6-sulpho, 2,5-dichloro-4-sulpho, 4-chloro-3-carboxy, 5-chloro-2-carboxy, 2-chloro-5-carboxy, 2-fluoro, 3-fluoro, 3,5-dicarboxy, 3,5-dicarbomethoxy, 2-methyl-4,5-dichloro, 2,4,5-trichloro, 2,4-difluoro, 2,4-(disulphonic acid diphenyl ester) or 2-chloro-4-(sulphonic acid phenyl ester).

The novel compounds defined above exhibit a more or less pronounced fluorescence in solution or when finely dispersed. They can be used for optically brightening a wide variety of synthetic, regenerated man-made or natural organic materials, or substances which contain such organic materials.

Without any restriction being implied by the following classification, examples of organic materials which can be optically brightened are:

I. Synthetic organic materials of high molecular weight:

(a) Polymerisation products based on organic compounds containing at least one polymerisable carbon-carbon double bond, i.e. their homopolymers or copolymers as well as their after-treatment products, for example crosslinking, grafting or degradation products, polymer blends, or products obtained by modification of reactive groups, for example polymers based on α,β-unsaturated carboxylic acids or derivatives of such carboxylic acids, especially on acrylic compounds (for example acrylates, acrylic acid, acrylonitrile, acrylamides and their derivatives of their methacrylic analogues), on olefin hydrocarbons (for example ethylene, propylene, styrenes or dienes and also ABS polymers), and polymers based on vinyl and vinylidene compounds (for example vinyl chloride, vinyl alcohol and vinylidene chloride);

(b) Polymerisation products which can be obtained by ring opening, for example polyamides of the polycaprolactam type, and also polymers which are obtained either by polyaddition or by polycondensation, such as polyethers or polyacetals;

(c) Polycondensation products or precondensates based on bifunctional or polyfunctional compounds with condensable groups, the homocondensation and co-condensation products and aftertreatment products thereof, for example polyesters, in particular saturated polyesters (for example polyesters of ethylene glycol and terephthalic acid) or unsaturated polyesters (for example maleic acid/dialcohol polycondensates and their crosslinking products with copolymerisable vinyl monomers), unbranched and branched polyesters (also including those based on polyhydric alcohols, for example alkyld resins), polyamides (for example hexamethylenediamine adipate), maleic resins, melamine resins, the precondensates and analogues thereof, polycarbonates and silicones;

(d) Polyaddition products, such as polyurethanes (cross-linked and non-crosslinked) and epoxide resins.

II. Regenerated man-made organic materials, for example cellulose esters of varying degrees of esterification (so-called 2½-acetate or triacetate) or cellulose ethers, regenerated cellulose (viscose or cuprammonium cellulose), or their aftertreatment products, and casein plastics.

III. Natural organic materials of animal or vegetable origin, for example based on cellulose or proteins, such as cotton, wool, line, silk, varnish gums, starch and casein.

The organic materials to be optically brightened can be in the most diverse states of processing (raw materials, semi-finished goods or finished goods). On the other hand, they can be in the form of structures of the most diverse shapes, for example predominantly three-dimensionally expanded structures, such as sheets, profiles, injection mouldings, various machined articles, chips, granules or foams, and also predominantly two-dimensional structures, such as films, foils, lacquers, coatings and impregnations, or predominantly one-dimensional bodies, such as filaments, fibres, flocks and wires. The said materials can, on the other hand, also be in an unshaped state, in the most diverse homogeneous or inhomogeneous forms of division, as for example in the form of powders, solutions, emulsions, dispersions, latices, pastes or waxes.

Fibrous materials can be, for example, in the form of endless filaments (stretched or unstretched), staple fibers, flocks, hanks, textile filaments, yarns, threads, non-wovens, felts, waddings, flocked structures or woven textile or bonded textile fabrics, knitted fabrics and papers, cardboards or paper pulps.

The compounds to be used according to the invention are of importance, inter alia, for the treatment of organic textile materials, especially woven textile fabrics. If fibres which can be in the form of staple fibres or endless filaments or in the form of hanks, woven fabrics, knitted fabrics, non-wovens, flocked substrates or bonded fabrics, are to be optically brightened according to the invention, this is advantageously effected in an aqueous medium, in which the compounds in question are present in a finely divided form (suspensions, so-called microdispersions, or optionally solutions). If desired, dispersing agents, stabilisers, wetting agents and further assistants can be added during the treatment.

Depending on the type of brightener compound used, it can be advantageous to carry out the treatment in a neutral or alkaline or acid bath. The treatment is usally carried out at temperature between about 20° and 140° C., for example at the boiling point of the bath or near it (about 90° C.). Solutions or emulsions in organic solvents can also be used for the finishing, according to the invention, of textile substrates, as is practised in the dyeing industry in so-called solvent dyeing (pad-thermofixation, or exhaust dyeing processes in dyeing machines).

The novel fluorescent brightening agents of the present invention can further be added to, or incorporated in, the materials before or during their shaping, thus they can for example be added to the compression moulding composition or injection moulding composition during the manufacture of films, sheets (for example incorporated in polyvinyl chloride in a roll mill at elevated temperature) or mouldings.

If the fashioning of man-made synthetic or regenerated man-made organic materials is effected by spinning processes or from spinning solutions/melts, the fluorescent brightening agents can be applied by the following processes:

Addition to the starting substances (for example monomers) or intermediates (for example precondensates or prepolymers), i.e. before or during the polymerisation, polycondensation of polyaddition, Sprinkling in powder form on polymer chips or granules for spinning solutions/melts, Bath dyeing of polymer chips or granules for spinning solutions/melts, Metered addition to spinning melts or spinning solutions, and Application to the spun tow before stretching.

The novel fluorescent brightening agents of the present invention can, for example, also be employed in the following use forms:

(a) In mixtures with dyes (shading) or pigments (coloured pigments or especially, for example, white pigments), or as an additive to dyebaths, printing pastes, discharge pastes or reserve pastes, or for the aftertreatment or dyeings, prints or discharge prints;

(b) In mixtures with carriers, wetting agents, plasticisers, swelling agents, antioxidants, light stabilisers, heat stabilisers and chemical bleaching agents (chlorite bleach or bleaching bath additives);

(c) In admixture with crosslinking agents or finishing agents (for example starch or synthetic finishes), and in combination with a wide variety of textile finishing processes, especially resin finishes (for example crease-proof finishes such as wash-and-wear, permanent-press or non-iron), as well as flameproof finishes, soft-handle finishes, anti-soiling finishes or antistatic finishes, or antimicrobial finishes;

(d) Incorporation of the fluorescent brightening agents into polymeric carriers (polymerisation, polycondensation or polyaddition products), in dissolved or dispersed form, for use, for example, in coating agents, impregnating agents or binders (solutions, dispersions and emulsions) for textiles, non-wovens, papers and leather;

(e) As additives to master batches;

(f) As additives to a wide variety of industrial products in order to render these more marketable (for example improving the appearance of soaps, detergents and pigments);

(g) In combination with other fluorescent brightening substances;

(h) In spinning bath preparations, i.e. as additives to spinning baths which are used for improving the slip for the further processing of synthetic fibres, or from a special bath before the stretching of the fibre;

(i) As scintillators for various purposes of a photographic nature, for example for electrophotographic reproduction or supersensitising; and (j) Depending on the substitution, as laser dyes.

If the brightening process is combined with textile treatment or finishing methods, the combined treatment can in many cases advantageously be carried out with the aid of appropriate stable preparations which contain the fluorescent brightener compounds in such a concentration that the desired white effect is achieved.

In certain cases, the fluorescent brighteners are made fully effective by an aftertreatment. This can be, for example, a chemical treatment (for example acid treatment), a thermal treatment, or a combined chemical/thermal treatment. Thus, for example, the appropriate procedure to follow in brightening a number of fibre substrates, for example polyester fibres, with the fluorescent brightening agents of the present invention, is to impregnate these fibres with the aqueous dispersions (or optionally also solutions) of the brighteners at temperatures below 75° C., for example at room temperature, and to subject them to a dry heat treatment at temperatures above 100° C., it being generally advisable additionally to dry the fibrous material beforehand at a moderately elevated temperature, for example at not less than 60° C. to about 130° C. The heat treatment in the dry state is then advantageously carried out at temperatures between 120° and 225° C., for example by heating in a drying chamber, by ironing within the specified temperature range or by treatment with dry, superheated steam. The drying and dry heat treatment can also be carried out in immediate succession or combined in a single operation.

The amount of novel fluorescent brightening agent to be used according to the invention, based on the weight of the material to be optically brightened, can vary within wide limits. A marked and lasting effect can be obtained even with very insignificant amounts, in certain cases 0.0001 percent by weight. It is also possible to use amounts of up to approximately 0.8 percent by weight and, on occasion, up to approximately 2 percent by weight. For most practical purposes, it is preferable to use amounts between 0.0005 and 0.5 percent by weight.

For various reasons it is often advantageous not to use the fluorescent brighteners by themselves, i.e. pure, but in admixture with a wide variety of assistants and extenders, for example anhydrous sodium sulphate, sodium sulphate decahydrate, sodium chloride, sodium carbonate, alkali metal phosphates, such as sodium or potassium orthophosphate, sodium or potassium pyrophosphate and sodium or potassium tripolyphosphates or alkali metal silicates.

Compounds of the formula (1) in which n is the number 1 are preferred and these effect pronounced brightening not only on polyacrylonitrile but especially on modified polyacrylonitrile ("Courtelle ®") and polyamide.

The quaternised compounds of the formula (1) are generally resistant to chlorite.

In a further aspect the present invention relates to novel 2-phenyl-5-benzimidazol-2'-yl-furanes of the formula having 3 or 4 carbon atoms, cyclohexyl, hydroxyalkyl having 2 to 4 carbon atoms, alkoxyalkyl having a total of 3 to 6 carbon atoms, carboxyalkyl having 2 to 6 carbon atoms, carbalkoxyalkyl having a total of 3 to 6 carbon atoms, cyanoalkyl having 2 or 3 carbon atoms, benzyl, which is unsubstituted or substituted by methyl or methoxy, phenyl which is unsubstituted or substituted by chlorine, methyl or methoxy, dialkylaminoalkyl having a total of 3 to 7 carbon atoms or phenethyl, $Y_2$ is hydrogen, alkyl having 1 to 3 carbon atoms, alkenyl having 3 or 4 carbon atoms or hydroxyalkyl having 2 to 4 carbon atoms and $Y_1$ and $Y_2$ together with the nitrogen atom are a 5- or 6-membered aliphatic heterocyclic ring, which optionally can contain a further heteroatom and which is unsubstituted or substituted by non-chromophoric substituents, $R_2$ is alkyl having 1 to 8 carbon atoms, alkenyl having 3 or 4 carbon atoms, cyclohexyl, hydroxyalkyl having 2 to 4 carbon atoms, alkoxyalkyl having a total of 3 to 6 carbon atoms, carbalkoxy having 2 to 6 carbon atoms, carbalkoxyalkyl having a total of 3 to 6 carbon atoms, cyanoalkyl having 2 or 3 carbon atoms, benzyl which is unsubstituted or substituted by chlorine, methyl or methoxy, dialkylaminoalkyl having a total of 3 to 7 carbon atoms or phenethyl and, if n is the number 0, also hydrogen, $R_3$ is hydrogen, alkyl having 1 to 6 carbon atoms, hydroxyalkyl having 2 or 3 carbon atoms, cyanoalkyl having 2 or 3 carbon atoms, carboxyalkyl having 2 or 3 carbon atoms, carbamoylalkyl having 2 to 4 carbon atoms, alkoxycarbonylalkyl having a total of 3 to 6 carbon atoms, alkenyl having 3 or 4 carbon atoms or benzyl which is unsubstituted or substituted by chlorine or methyl, $R_4$ is chlorine, bromine, fluorine, carboxyl, carbalkoxy having a total of 2 to 5 carbon atoms, alkoxyalkoxycarbonyl having a total of 4 to 6 carbon atoms, benzyloxycarbonyl, cyano, sulpho, alkylsulphonyl having 1 to 4 carbon atoms, phenylsulphonyl which is unsubstituted or substituted by chlorine or methyl, benzylsulphonyl, sulphonic acid phenyl ester which is unsubstituted or non-chromophoric substituted, or —$SO_2$-$NY_1Y_2$ or —$CONY_1Y_2$ wherein $Y_1$ and $Y_2$ have the meaning given above, $R_5$ is hydrogen, chlorine, alkyl-

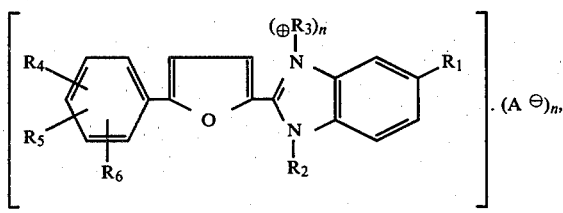

(A)

in which $R_1$ is a sulphonic acid group, a sulphonic acid phenyl ester and is unsubstituted or non-chromophoric substituted, alkylsulphonyl having 1 to 4 carbon atoms, benzylsulphonyl, phenylsulphonyl which is unsubstituted or substituted by methyl or chlorine, cyano, trifluoromethyl, —$SO_2NY_1Y_2$ or —$CONY_1Y_2$, in which $Y_1$ is hydrogen, alkyl having 1 to 8 carbon atoms, alkenyl sulphonyl having 1 to 4 carbon atoms, sulpho, methyl, sulphonic acid phenyl ester which is unsubstituted or non-chromophoric substituted or —$SO_2NY_1Y_2$ wherein $Y_1$ and $Y_2$ have the meaning given above, $R_6$ is hydrogen or chlorine, n is the number 0 or 1 and $A^\ominus$ is a colourless anion, to compounds of the formula

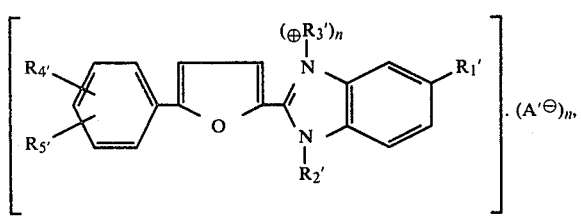
(B)

wherein $R_1'$ is sulpho, sulphonic acid phenyl ester, alkylsulphonyl having 1 to 4 carbon atoms, phenylsulphonyl, benzylsulphonyl, trifluoromethyl, cyano or —SO$_2$NY$_1'$Y$_2'$ wherein Y$_1'$ is hydrogen, alkyl having 1 to 4 carbon atoms, alkenyl having 3 or 4 carbon atoms, cyclohexyl, alkoxyalkyl having a total of 3 to 6 carbon atoms or benzyl and Y$_2'$ is hydrogen, alkyl having 1 to 3 carbon atoms or alkenyl having 3 or 4 carbon atoms and Y$_1'$ and Y$_2'$ together with the nitrogen atom are a piperidine ring, pyrrolidine ring or a morpholine ring which is unsubstituted or substituted by 2 methyl groups, R$_2'$ is alkyl having 1 to 4 carbon atoms, alkenyl having 3 or 4 carbon atoms, cyclohexyl, alkoxyalkyl having a total of 3 to 6 carbon atoms or benzyl and, if n is the number 0, also hydrogen, R$_3'$ is hydrogen, alkyl having 1 to 4 carbon atoms, hydroxyalkyl having 2 or 3 carbon atoms, alkenyl having 3 or 4 carbon atoms or benzyl, R$_4'$ is chlorine, carbalkoxy having 2 to 5 carbon atoms, cyano, sulpho, alkylsulphonyl having 1 to 4 carbon atoms, phenylsulphonyl, benzylsulphonyl, sulphonic acid phenyl ester or —SO$_2$NY$_1'$Y$_2'$ or —CONY$_1'$Y$_2'$ wherein Y$_1'$ and Y$_2'$ have the meaning given above, R$_5'$ is hydrogen or chlorine, n is the number 0 or 1 and A$'^\ominus$ is halide, formiate acetate, lactate, CH$_3$SO$_4\ominus$, C$_2$H$_5$SO$_4\ominus$, C$_6$H$_5$SO$_3\ominus$, p-CH$_3$-C$_6$H$_4$SO$_3\ominus$, p-Cl-C$_6$H$_4$SO$_3\ominus$, carbonate or bicarbonate, to compounds of the formula

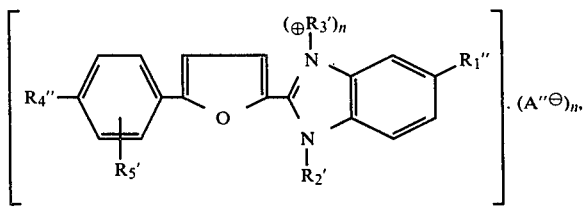
(C)

wherein $R_1''$ is sulphonic acid phenyl ester, alkylsulphonyl having 1 to 4 carbon atoms, phenyl sulfonyl, benzyl sulphonyl, cyano or —SO$_2$NY$_1'$Y$_2'$ wherein Y$_1'$ is hydrogen, alkyl having 1 to 4 carbon atoms, alkenyl having 3 or 4 carbon atoms, cyclohexyl, alkoxyalkyl having a total of 3 to 6 carbon atoms or benzyl, Y$_2'$ is hydrogen, alkyl having 1 to 3 carbon atoms or alkenyl having 3 or 4 carbon atoms and Y$_1'$ and Y$_2'$ together with the nitrogen atom are a piperidine ring, a pyrrolidine ring or a morpholine ring which is unsubstituted or substituted by two methyl groups, R$_2'$ has the meaning given above, R$_3'$ is hydrogen, alkyl having 1 to 4 carbon atoms, hydroxyalkyl having 2 or 3 carbon atoms, alkenyl having 3 or 4 carbon atoms or benzyl, R$_4''$ is chlorine, carbalkoxy having 2 to 5 carbon atoms, cyano, alkylsulphonyl having 1 to 4 carbon atoms, phenylsulphonyl, benzylsulphonyl, sulphonic acid phenyl ester or —SO$_2$NY$_1'$Y$_2'$ or —CONY$_1'$Y$_2'$ wherein Y$_1'$ and Y$_2'$ have the meaning given above, R$_5'$ is hydrogen or chlorine, n is the number 0 or 1 and A$''^\ominus$ is chloride, bromide, jodide, formiate, acetate, lactate, CH$_3$SO$_4\ominus$, C$_2$H$_5$SO$_4\ominus$, C$_6$H$_5$SO$_3\ominus$, p-CH$_3$-C$_6$H$_4$SO$_3\ominus$, p-Cl-C$_6$H$_4$SO$_3\ominus$, carbonate or bicarbonate, to compounds of the formula

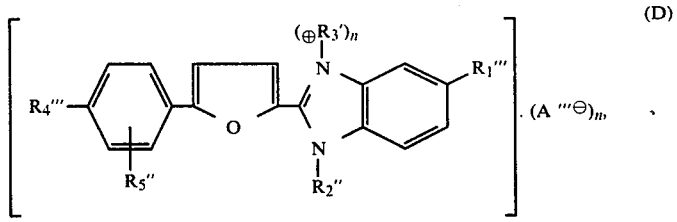
(D)

wherein $R_1'''$ is sulphonic acid phenyl ester, alkylsulphonyl having 1 to 4 carbon atoms, cyano, trifluoromethyl or —SO$_2$NY$_1''$Y$_2''$, wherein Y$_1''$ is hydrogen, alkyl having 1 to 4 carbon atoms, alkenyl having 3 or 4 carbon atoms, hydroxyalkyl having 2 to 4 carbon atoms, phenyl or cyclohexyl, Y$_2''$ is hydrogen, alkyl having 1 to 4 carbon atoms or hydroxyalkyl having 2 to 4 carbon atoms, and Y$_1''$ and Y$_2''$ together with the nitrogen atom are the morpholine ring, R$_2''$ is alkyl having 1 to 4 carbon atoms, hydroxyalkyl having 1 to 4 carbon atoms, alkenyl having 3 or 4 carbon atoms, benzyl or cyclohexyl, R$_3''$ is alkyl having 1 to 4 carbon atoms, hydroxyalkyl having 1 to 4 carbon atoms, alkoxycarbonylalkyl having 3 to 6 carbon atoms or benzyl, R$_4'''$ is chlorine, carboxyl, carbalkoxy having 2 to 5 carbon atoms, sulpho, alkylsulphonyl having 1 to 4 carbon atoms, phenylsulphonyl, benzylsulphonyl, cyano, sulphonic acid phenyl ester, carbamoyl or —SO$_2$NHY$_1'''$ wherein Y$_1'''$ is hydrogen or alkyl having 1 to 4 carbon atoms, R$_5''$ is hydrogen, chlorine or methyl, n is the number 0 or 1 and A$'''^\ominus$ is chloride, bromide, iodide, $CH_3SO_4^{\ominus}$, $C_2H_5SO_4^{\ominus}$ or $p$—$CH_3$—$C_6H_4$—$SO_3^{\ominus}$, to compounds of the formula

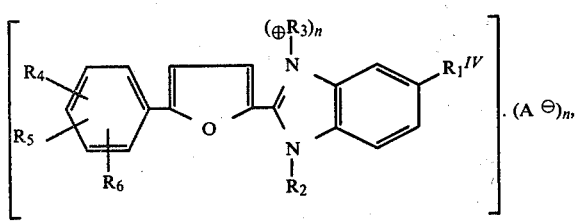

$\cdot (A^{\ominus})_n$, (E)

wherein $R_1'$ is trifluoromethyl or sulphonic acid phenyl ester which is unsubstituted or substituted by one to three alkyl groups having 1 to 4 carbon atoms, chlorine or methoxy, $R_2$ is alkyl having 1 to 8 carbon atoms, alkenyl having 3 or 4 carbon atoms, cyclohexyl, hydroxyalkyl having 2 to 4 carbon atoms, alkoxyalkyl having a total of 3 to 6 carbon atoms, carbalkoxy having 2 to 6 carbon atoms, carbalkoxyalkyl having a total of 3 to 4 carbon atoms, cyanoalkyl having 2 or 3 carbon atoms, benzyl which is unsubstituted or substituted by chlorine, methyl or methoxy, dialkylamino alkyl having a total of 3 to 7 carbon atoms or phenethyl and, if n is the number 0, also hydrogen, $R_3$ is hydrogen, alkyl having 1 to 6 carbon atoms, hydroxyalkyl having 2 or 3 carbon atoms, cyanoalkyl having 2 or 3 carbon atoms, carboxyalkyl having 2 or 3 carbon atoms, carbamoylalkyl having 2 to 4 carbon atoms, alkoxycarbonylalkyl having a total of 3 to 6 carbon atoms, alkenyl having 3 or 4 carbon atoms or benzyl which is unsubstituted or substituted by chlorine or methyl, $R_4$ is chlorine, bromine, fluorine, carboxyl, carbalkoxy having a total of 2 to 5 carbon atoms, alkoxyalkoxycarbonyl having a total of 4 to 6 carbon atoms, benzyloxycarbonyl, cyano, sulpho, alkylsulphonyl having 1 to 4 carbon atoms, phenylsulphonyl which is unsubstituted or substituted by chlorine or methyl, benzylsulphonyl, sulphonic acid phenyl ester which is unsubstituted or non-chromophoric substituted or —$SO_2NY_1Y_2$ or —$CONY_1Y_2$ wherein $Y_1$ and $Y_2$ have the meaning given above, $R_5$ is hydrogen, chlorine, alkylsulphonyl having 1 to 4 carbon atoms, sulpho, methyl, sulphonic acid phenyl ester which is unsubstituted or non-chromophoric substituted or —$SO_2NY_1Y_2$ wherein $Y_1$ and $Y_2$ have the meaning given above, $R_6$ is hydrogen or chlorine, n is the number 0 or 1 and $A^{\ominus}$ is a colourless anion.

The present invention relates also to process for the preparation of compounds of formula (A) as defined above, which comprise (a) condensing a compound of the formula

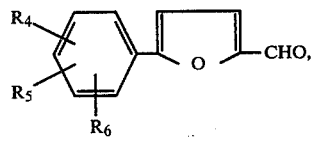

wherein $R_4$, $R_5$ and $R_6$ have the meaning given under formula (A), with an o-phenylenediamine of the formula

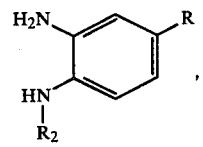

wherein $R_1$ and $R_2$ are as defined under formula (A), to give azomethines of the formula

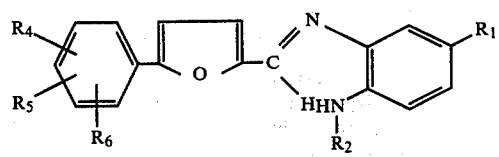

and then oxidising or dehydrogenating the latter to the corresponding 2-phenyl-5-benzimidazol-2'-yl-furanes of the formula (A) in which n is the number 0 and, if desired, quaternising the latter with an alkylating agent to give compounds of the formula (A) in which n is the number 1, or (b) condensing a furane-5-carboxylic acid of the formula

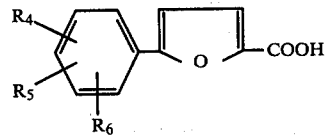

or a functional derivative thereof, in which $R_4$, $R_5$ and $R_6$ are as defined under formula (A) with an o-phenylenediamine of the formula

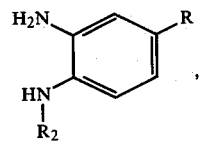

in which $R_1$ and $R_2$ are as defined under formula (A) and quaternising the resulting compound of the formula (A) in which n is the number 0, if desired with an alkylating agent, to a compound of the formula (A) in which n is the number 1.

In the Examples, percentages are always by weight. The melting points are uncorrected and in the case of the quaternary compounds are usually not sharp.

EXAMPLE 1

21.3 ml of an aqueous 40% strength solution of sodium bisulphite are added to a hot solution of 26.7 g of 2-(4'-chlorophenyl)-furane-5-aldehyde (purity 77.4%) and 29.25 g of phenyl 3-amino-4-ethylaminobenzenesulphonate in 200 ml of ethylene glycol monomethyl ether. The mixture is stirred at the reflux temperature for 2 hours, diluted with 40 ml of water and allowed to cool. The product which has precipitated out is filtered off with suction, washed repeatedly with methanol and water and dried in vacuo at 100° C. This gives 40.4 g (84% of theory) of the compound of the formula

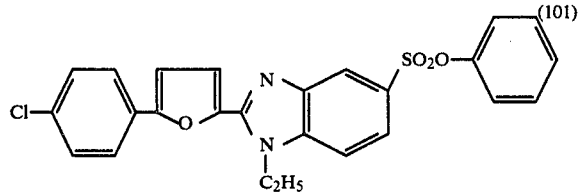

which after recrystallisation from perchloroethylene and ethylene glycol monomethyl ether is isolated in the form of virtually colourless crystals having a melting point of 171° C.

EXAMPLE 2

20.7 g of 2-(4'-chlorophenyl)-furane-5-aldehyde and 20.1 g of 2-methylamino-4-methylsulphonyl-aniline in 60 ml of ethanol are refluxed for 20 minutes. 40 ml of nitrobenzene are added, the ethanol is distilled off and the temperature is raised to the boiling point of the nitrobenzene. After 5 minutes at the reflux temperature, the mixture is allowed to cool, 40 ml of methanol are added and the precipitate which has formed is filtered off with suction, washed with methanol and dried in vacuo. This gives 22.3 g of the compound of the formula

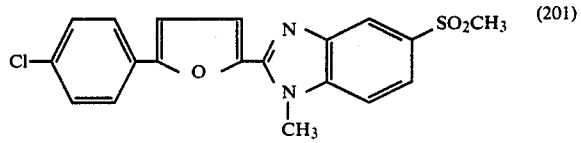

which after recrystallisation from o-dichlorobenzene and ethylene glycol monomethyl ether is isolated in the form of virtually colourless crystals having a melting point of 235° C.

Compounds of the formula

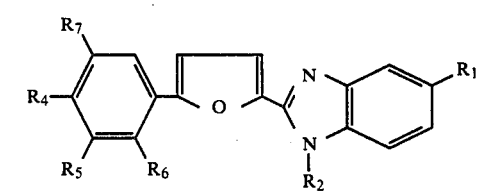

in which the substituents $R_1$, $R_2$, $R_4$, $R_5$, $R_6$ and $R_7$ are as defined in Table I, are obtained according to Example 1 or 2 from the corresponding 2-phenyl-furane-5-aldehydes and o-phenylenediamines of the formulae (14a) and (15) respectively:

TABLE I

| Compound of the formula No. | $R_4$ | $R_5$ | $R_6$ | $R_7$ | $R_2$ | $R_1$ | Melting point °C. |
|---|---|---|---|---|---|---|---|
| (203) | Cl | H | Cl | H | $CH_3$ | $SO_2CH_3$ | 233 |
| (204) | Cl | H | H | H | $CH_3$ | $SO_2OC_6H_5$ | 191 |
| (205) | $COOC_2H_5$ | H | H | H | $CH_3$ | $SO_2CH_3$ | 241 |
| (206) | CN | H | H | H | $CH_3$ | $SO_3CH_3$ | 307 |
| (207) | Cl | Cl | H | H | $CH_3$ | $SO_2CH_3$ | 243 |
| (208) | Cl | H | H | H | $CH_3$ | $SO_2NHCH_3$ | 241 |
| (209) | Cl | H | H | H | $CH_2C_6H_5$ | $SO_2N(CH_3)_2$ | 216 |
| (210) | Cl | H | H | H | $CH_3$ | $CONHCH_3$ | 239 |
| (211) | Cl | H | H | H | $CH_3$ | CN | 212 |
| (212) | $SO_2NH_2$ | H | H | H | $CH_3$ | $SO_2CH_3$ | 342 |
| (213) | Cl | H | H | H | $CH_3$ | $SO_2N(C_6H_5)(C_2H_5)$ | 189 |
| (214) | $SO_3H$ | H | H | H | $CH_3$ | $SO_2CH_3$ | >360 |
| (215) | Cl | H | H | H | $CH_3$ | $CF_3$ | 184 |
| (216) | Cl | H | Cl | H | $CH_3$ | $SO_2OC_6H_5$ | 221 |
| (217) | $SO_2OC_6H_5$ | H | H | H | $CH_3$ | $SO_2CH_3$ | 192 |
| (218) | $SO_2CH_3$ | H | H | H | $CH_3$ | $SO_2CH_3$ | 301 |
| (219) | Cl | H | $CH_3$ | H | $CH_3$ | $SO_2CH_3$ | 208 |
| (220) | H | H | Cl | H | $CH_3$ | $SO_2CH_3$ | 205 |
| (221) | $SO_2NHCH_3$ | H | H | H | $CH_3$ | $SO_2CH_3$ | 299 |
| (222) | Cl | H | H | H | $CH_3$ | $COOCH_3$ | 271 |
| (223) | Cl | H | H | H | $CH_3$ | CCOH | 329 |
| (224) | Cl | H | Cl | Cl | $CH_3$ | $SO_2CH_3$ | 255 |
| (255) | Cl | H | H | H | $CH_2C_6H_5$ | $CF_3$ | 204 |
| (226) | COOH | H | H | H | $CH_3$ | $SO_2OC_6H_5$ | 294 |
| (227) | Cl | $CF_3$ | H | H | $CH_3$ | $SO_2CH_3$ | 283 |
| (228) | Cl | H | H | H | H | $SO_2CH_3$ | 223 |
| (229) | Cl | H | H | H | $CH_3$ | $SO_2C_6H_5$ | 232 |
| (230) | H | H | H | H | $CH_3$ | $SO_2OC_6H_5$ | 189 |
| (231) | Cl | H | H | H | $CH_2C_6H_5$ | $SO_2CH_3$ | 207 |
| (232) | Cl | H | H | H | $CH_2C_6H_5$ | $SO_2OC_6H_5$ | 177 |
| (233) | Cl | H | H | H | $CH_3$ | 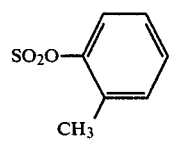 | 199 |
| (234) | Cl | H | H | H | $CH_3$ | $SO_2N(CH_3)_2$ | 232 |
| (235) | Cl | H | H | H | $C_2H_5$ | COOH | 330 |
| (236) | Cl | H | H | H | $CH_2C_6H_5$ | $SO_2NH_2$ | 272 |

TABLE I-continued

| Compound of the formula No. | R4 | R5 | R6 | R7 | R2 | R1 | Melting point °C. |
|---|---|---|---|---|---|---|---|
| (237) | Cl | H | H | H | CH3 | SO2NHCH2CH2OCH3 | 231 |
| (238) | Cl | H | H | H | CH2C6H5 | CONH2 | 283 |
| (239) | CONH2 | H | H | H | CH3 | SO2OC6H5 | 226 |
| (240) | Cl | H | H | H | CH3 | SO2C2H5 | 213 |
| (241) | Cl | H | H | H | C2H5 | SO2CH3 | 200 |
| (242) | H | Cl | H | H | CH3 | SO2OC6H5 | 177 |
| (243) | Cl | H | H | H | CH3 | SO2NH(CH2)3N(CH3)2 | 232 |
| (244) | Cl | H | H | H | CH3 | SO2NHCH2CH2OH | 207 |
| (245) | Cl | H | H | H | CH2C6H5 | COOCH3 | 227 |
| (246) | Cl | H | H | H | CH2C6H5 | CN | 217 |
| (247) | Cl | H | H | H | n-C4H9 | SO3H* | >360 |
| (248) | H | H | H | H | CH3 | SO2CH3 | 237 |
| (249) | Cl | H | H | H | CH2C6H5 | COOH | 312 |
| (250) | Cl | H | H | H | CH2CH=CH2 | SO2NHCH2CH=CH2 | 208 |
| (251) | Cl | H | H | H | CH2C6H5 | SO2NH—CH2C6H5 | 210 |
| (252) | Cl | H | H | H | CH2COOCH3 | SO2OC6H5 | 255 |
| (253) | CH3 | H | H | H | CH3 | SO2OC6H5 | 200 |
| (254) | Cl | H | CH3 | H | CH3 | SO2OC6H5 | 203 |
| (255) | Cl | H | H | H | CH2CN | SO2OC6H5 | 171 |
| (256) | Cl | H | H | H | CH2COOH | SO2OC6H5 | 271 (decomposition) |

The sulphonic acid of the formula (247) is obtained according to Example 1 initially in the form of the soluble sodium salt. In order to precipitate it, the reaction mixture is acidified with hydrochloric acid.

The o-nitroanilines and the o-phenylenediamines obtained therefrom by reduction, which are required for the preparation of the compounds mentioned in Examples 1, 2 and 3 and have the formulae

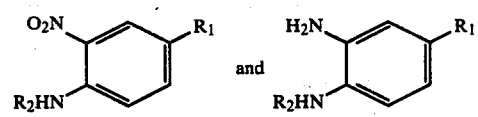

are listed in Table II:

TABLE II

| | | | Melting point °C. for compound | |
|---|---|---|---|---|
| No. | R1 | R2 | A | B |
| 1 | SO2CH3 | CH3 | 193 | 98 |
| 2 | SO2NHCH3 | CH3 | 181 | 103 |
| 3 | SO3Na | CH3 | 324 | 290 (decomposition) |
| 4 | CN | CH3 | 168 | 140 |
| 5 | SO2N(C6H5)(C2H5) | CH3 | 142 | 105 |
| 6 | CONHCH3 | CH3 | 206 | 155 |
| 7 | SO2N(CH3)2 | CH2C6H5 | 157 | 195 |
| 8 | CF3 | CH3 | 74 | 50 |
| 9 | COOH | CH3 | 310 | 197 (decomposition) |
| 10 | COOCH3 | CH3 | 145 | 102 |
| 11 | SO2—N(CH3)2 | CH3 | 152 | 159 |
| 12 | COOH | C2H5 | 234 | 194 (decomposition) |
| 13 | SO2OC6H5 | CH3 | 101 | 110* |
| 14 | SO2—NH(CH2)3—N(CH3)2 | CH3 | 115 | 99 |
| 15 | SO3Na | n-C4H9 | 300 (decomposition) | 296 (decomposition) |
| 16 | SO2NH2 | CH2C6H5 | 190 | 154 |
| 17 | SO2NH—CH2CH=CH2 | CH2CH=CH2 | 86 | 75 |
| 18 | SO2NH2 | n-C4H9 | 178 | 116 |
| 19 | COOH | CH2—C6H5 | 208 | 204 |
| 20 | SO2—NH—CH2CH2—OCH3 | CH3 | 103 | liquid (crude) |
| 21 | CONH2 | CH2—C6H5 | 200 | 186 |
| 22 | SO2NHCH2C6H5 | CH2—C6H5 | 135 | 141 |
| 23 | SO2OC6H5 | CH2—C6H5 | 125 | 139 |
| 24 | CF3 | CH2—C6H5 | 80 | 94 |
| 25 | SO2OC6H4—o—CH3 | CH3 | 101 | 110 |
| 26 | SO2OC6H5 | C2H5 | 104 | 114 |
| 27 | SO2CH3 | CH2—C6H5 | 135 | 171 |
| 28 | SO2C2H5 | CH3 | 125 | 102 |
| 29 | SO2CH3 | C2H5 | 162 | 131 |
| 30 | SO2NHCH2CH2OH | CH3 | 145 | 120 |
| 31 | COOCH3 | CH2—C6H5 | 101 | 129 |
| 32 | CN | CH2—C6H5 | 128 | not isolated |
| 33 | SO2OC6H5 | CH2COOCH3 | 122 | not isolated |

TABLE II-continued

| No. | R₁ | R₂ | Melting point °C. for compound A | B |
|---|---|---|---|---|
| 34 | SO₂OC₆H₅ | CH₂CN | 133 | not isolated |
| 35 | SO₂OC₆H₅ | CH₂COOH | 175 | not isolated |

*Melting point of the hydrochloride: 185° C. (decomposition)

The 2-phenylfurane-5-aldehyde derivatives which are obtained by reacting furfurol with corresponding diazotised anilines in aqueous solution in the presence of copper-I chloride and which were not known hitherto are described in Table III.

TABLE III

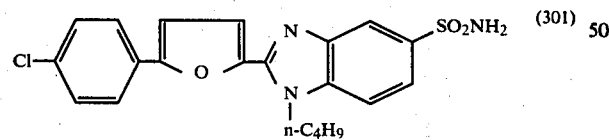

| Compound No. | R₂ | R₃ | R₄ | R₅ | Melting point °C. |
|---|---|---|---|---|---|
| 1 | H | H | —SO₂OC₆H₅ | H | 112 |
| 2 | CH₃ | H | —Cl | H | 114 |
| 3 | H | H | —SO₂NHCH₃ | H | 153 |
| 4 | Cl | H | —Cl | Cl | 133 |
| 5 | H | CF₃ | —Cl | H | 90 |
| 6 | H | H | —CONH₂ | H | 180 |

EXAMPLE 3

22.3 g of 2-(4'-chlorophenyl)-furane-5-carboxylic acid in 9.7 ml of thionyl chloride, 60 ml of toluene and 0.8 ml of dimethylformamide are refluxed for 1 hour and the solution is completely evaporated in vacuo. The solid residue (the acid chloride) is introduced in portions into a solution of 24.3 g of 3-amino-4-n-butylaminobenzene-sulphonamide in 150 ml of glacial acetic acid, 9.0 g of anhydrous sodium acetate are also added and the resulting mixture is stirred for 1 hour at room temperature. The mixture is now heated at the reflux temperature for 3 hours and allowed to cool and 150 ml of water are added. The product which has separated out is filtered off with suction, washed repeatedly with water and dried. This gives 39.7 g (92% of theory) of the compound of the formula (301)

Melting point 260° C., after recrystallization from o-dichlorobenzene and ethylene glycol monomethyl ether.

EXAMPLE 4

49.9 g of the Na salt of 4-chloro-3-nitrobenzenesulphonic acid (purity 55.3%, based on the free sulphonic acid) are stirred in 90 ml of a 20% strength aqueous solution of methylamine and 15 ml of dioxane for 1 hour at 60° C. The mixture is heated at the reflux temperature for a further 2 hours, the solution is allowed to cool to about 5° C. and the voluminous crystalline product is filtered off with suction. After washing the residue twice with acetone and drying in vacuo at 100° C., 21.8 g of the compound of the formula

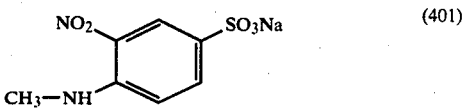

are obtained. The product can be recrystallised from n-propanol/water, 8:2.

A solution of 405.4 g of the crude product of the formula (401) in 2,500 ml of water is hydrogenated at 50° C. in the presence of 40.5 g of Raney nickel under normal pressure. The catalyst is filtered off and the aqueous solution is evaporated to dryness in vacuo in a rotary evaporator. This gives 351.6 g of a dark coloured crude product of the formula

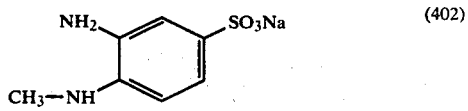

The compound is obtained in the form of the free sulphonic acid by recrystallising a sample from 20% strength hydrochloric acid.

22.5 g of the crude compound of the formula (402) are reacted with 20.7 g of 2-(4'-chlorophenyl)-furane-5-aldehyde, according to Example 2. The resulting product (23.4 g) of the formula

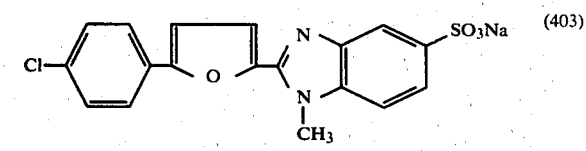

is recrystallised from n-propanol/water, 8:2, and dissolved in water. 6 ml of concentrated hydrochloric acid are added dropwise, with stirring, and the compound of the formula

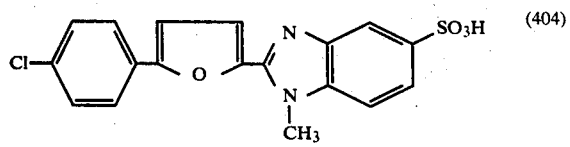

is obtained in the form of its inner salt of the formula

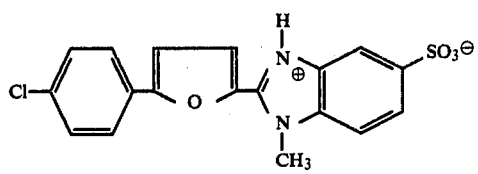 (405)

This inner salt is washed with glacial acetic acid, water and alcohol and dried in vacuo at 100° C.

EXAMPLE 5

38.8 g of the crude sulphonic acid of the formula (247) in 300 ml of chlorobenzene, 23 ml of thionyl chloride and 1 ml of dimethylformamide are stirred under reflux for 3 hours, after which time the evolution of hydrogen chloride has ceased. The resulting solution is allowed to cool to 5° C. and the crystalline precipitate is filtered off with suction, washed with xylene and dried in vacuo at 80° C. This gives 30.6 g of the sulphonyl chloride of the formula

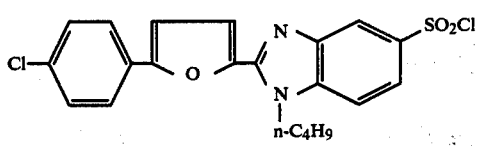 (501)

After recrystallisation from xylene, a sample melts at 164° C.

9.0 g of the compound of the formula (501 ) are warmed in 60 ml of ethylene glycol monomethyl ether and 4.9 ml of pyridine to 80° C. for 15 minutes, during which time the compound goes into solution. On cooling to 5° C. and adding 60 ml of water, the reaction product crystallises out. This is filtered off with suction, washed repeatedly with water and dried over calcium chloride, in vacuo at room temperature. This gives 7.5 g (77% of theory) of the sulphonic acid ester of the formula

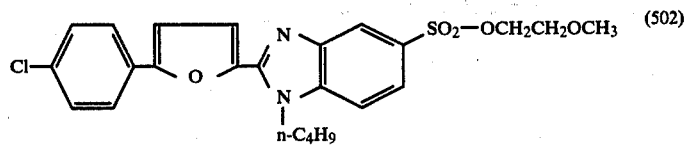 (502)

After recrystallisation from carbon tetrachloride, the product melts at 146° C.

The two sulphonic acid esters of the formulae

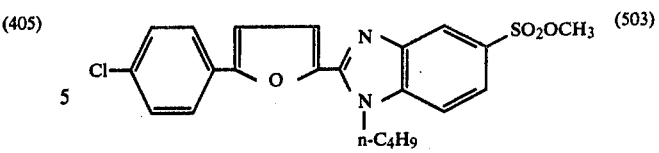 (503)

melting point 131° C., and

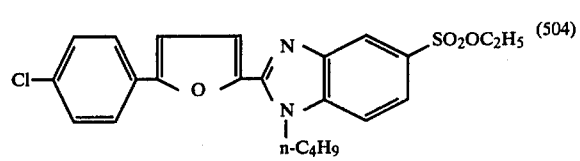 (504)

melting point 131° C. (crude), are obtained in a similar manner.

EXAMPLE 6

2.3 ml of dimethyl sulphate are added dropwise to a solution of 7.73 g of the compound of the formula (201) in 40 ml of dimethylformamide, at 120° C., with stirring. After the dropwise addition is complete, the mixture is stirred at this temperature for a further ½ hour, allowed to cool and diluted with 40 ml of isopropanol. The product which has crystallised out is filtered off with suction, washed with isopropanol and dried in vacuo at 100° C. This gives 9.75 g (95% of theory) of the compound of the formula

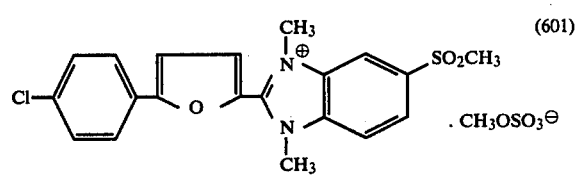 (601)

The compound can be used direct for brightening polyacrylonitrile or can be purified by recrystallisation from water, from which it precipitates in the form of luminous pale yellow crystals having a melting point of 276° C.

The compounds of the general formula

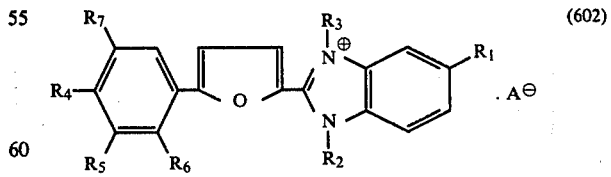 (602)

in which $R_1$, $R_2$, $R_3$, $R_4$, $R_5$, $R_6$, $R_7$ and A are as defined in Table IV, are obtained in a similar manner.

TABLE IV

| Compound No. | R₁ | R₂ | R₃ | R₄ | R₅ | R₆ | R₇ | A | Melting point °C. |
|---|---|---|---|---|---|---|---|---|---|
| 603 | SO₃⁻ | CH₃ | CH₃ | Cl | H | H | H | — | 350 |
| 604 | SO₂CH₃ | CH₃ | CH₃ | Cl | H | Cl | H | CH₃OSO₃ | 225 |
| 605 | SO₂OC₆H₅ | CH₃ | CH₃ | Cl | H | H | H | CH₃OSO₃ | 214 |
| 606 | SO₂CH₃ | CH₃ | CH₃ | COOC₂H₅ | H | H | H | CH₃OSO₃ | 245 |
| 607 | SO₂CH₃ | CH₃ | CH₃ | CN | Cl | H | H | CH₃OSO₃ | 241 |
| 608 | SO₂CH₃ | CH₃ | CH₃ | Cl | H | H | H | CH₃OSO₃ | 240 |
| 609 | SO₂NHCH₃ | CH₂C₆H₅ | CH₃ | Cl | H | H | H | CH₃OSO₃ | 246 |
| 610 | SO₂N(CH₃)₂ | CH₃ | CH₃ | Cl | H | H | H | CH₃OSO₃ | 158 |
| 611 | CN | CH₃ | CH₃ | Cl | H | H | H | CH₃OSO₃ | 275 |
| 612 | CONHCH₃ | CH₃ | CH₃ | Cl | H | H | H | CH₃OSO₃ | 247 |
| 613 | SO₂CH₃ | CH₃ | C₂H₄OH | Cl | H | H | H | Cl | 265 |
| 614 | CF₃ | CH₃ | CH₃ | Cl | H | H | H | CH₃OSO₃ | decomposition |
| 615 | SO₂CH₃ | CH₃ | CH₃ | SO₂NH₂ | H | H | H | CH₃OSO₃ | 212 |
| 616 | SO₂OC₆H₅ | CH₃ | CH₃ | Cl | H | H | H | CH₃OSO₃ | 198 |
| 617 | SO₂NH₂ | n-C₄H₉ | CH₃ | Cl | H | H | H | CH₃OSO₃ | 228 |
| 618 | SO₂N—C₆H₅<br>        C₂H₅ | CH₃ | CH₃ | Cl | H | H | H | CH₃OSO₃ | 174 |
|  |  |  |  |  |  |  |  |  | 166 |
| 619 | SO₂CH₃ | CH₃ | CH₃ | SO₂CH₃ | H | H | H | CH₃OSO₃ | 258 |
| 620 | SO₂CH₃ | CH₃ | CH₃ | Cl | H | CH₃ | H | CH₃OSO₃ | 220 |
| 621 | SO₂OC₆H₅ | CH₃ | CH₃ | SO₂OC₆H₅ | H | H | H | CH₃OSO₃ | 240 |
| 622 | SO₂CH₃ | CH₃ | CH₃ | H | H | Cl | H | CH₃OSO₃ | 197 |
| 623 | SO₂CH₃ | CH₃ | CH₃ | SO₂NHCH₃ | H | H | H | CH₃OSO₃ | 235 |
| 624 | COOCH₃ | CH₃ | CH₃ | Cl | H | H | H | CH₃OSO₃ | 257 |
| 625 | COOH | CH₃ | CH₃ | Cl | H | H | H | CH₃OSO₃ | 266 |
| 626 | CF₃ | CH₂C₆H₅ | CH₃ | Cl | H | H | H | CH₃OSO₃ | 138 |
| 627 | SO₂CH₃ | CH₃ | CH₃ | COOH | H | Cl | Cl | CH₃OSO₃ | 252 |
| 628 | SO₂OC₆H₅ | CH₃ | CH₃ | Cl | CF₃ | H | H | CH₃OSO₃ | 235 |
| 629 | SO₂CH₃ | CH₃ | CH₃ | H | H | H | H | CH₃OSO₃ | 235 |
| 630 | SO₂C₆H₅ | CH₃ | CH₃ | Cl | H | H | H | CH₃OSO₃ | 278 |
| 631 | SO₂OC₆H₅ | CH₂C₆H₅ | CH₃ | Cl | H | H | H | CH₃OSO₃ | 190 |
| 632 | SO₂OC₆H₅ | CH₂C₆H₅ | CH₃ | Cl | H | Cl | H | CH₃OSO₃ | 209 |
| 633 | SO₂CH₃ | C₂H₅ | CH₃ | Cl | H | H | H | CH₃OSO₃ | 225 |
| 634 | SO₂OC₆H₅ | CH₃ | CH₃ | Cl | H | H | H | CH₃OSO₃ | 96 |
| 635 | 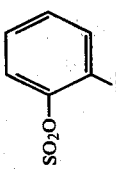 | CH₃ | CH₃ | Cl | H | H | H | CH₃OSO₃ | 204 |
| 636 | SO₂N(CH₃)₂ | CH₃ | CH₃ | Cl | H | H | H | CH₃OSO₃ | 219 |
| 637 | COOH | C₂H₅ | CH₃ | Cl | H | H | H | CH₃OSO₃ | 203 |
| 638 | SO₂NH₂ | CH₂C₆H₅ | CH₃ | Cl | H | H | H | CH₃OSO₃ | 157 |
| 639 | SO₂NH(CH₂)₂OCH₃ | CH₃ | CH₃ | Cl | H | H | H | CH₃OSO₃ | 225 |
| 640 | CONH₂ | CH₂C₆H₅ | CH₂CN | Cl | H | H | H | Cl | 241 |
| 641 | SO₂CH₃ | CH₃ | CH₃ | Cl | H | H | H |  | 248 |
| 642 | SO₂C₂H₅ | CH₃ | CH₃ | Cl | H | H | H | CH₃OSO₃ | 255 |
| 643 | SO₂CH₃ | C₂H₅ | CH₃ | Cl | H | H | H | CH₃OSO₃ | 196 |
| 644 | SO₂NH(CH₂)₃N⊕(CH₃)₃ | CH₃ | CH₃ | Cl | H | H | H | 2 CH₃OSO₃ | 250 |

TABLE IV-continued

| Compound No. | R₁ | R₂ | R₃ | R₄ | R₅ | R₆ | R₇ | A | Melting point °C. |
|---|---|---|---|---|---|---|---|---|---|
| 645 | SO₂OC₆H₅ | CH₃ | CH₃ | H | Cl | H | H | CH₃OSO₃ | 182 |
| 646 | COOCH₃ | CH₂C₆H₅ | CH₃ | Cl | H | H | H | CH₃OSO₃ | 202 |
| 647 | SO₂NHCH₂CH₂OH | CH₃ | CH₃ | Cl | H | H | H | CH₃OSO₃ | 174 |
| 648 | SO₂OC₆H₅ | CH₃ | CH₃ | CONH₂ | H | H | H | CH₃OSO₃ | 221 |
| 649 | SO₂OC₆H₅ | CH₃ | CH₂CONH₂ | Cl | H | H | H | Cl | 249 |
| 650 | SO₂OC₆H₅ | CH₃ | CH₂C₆H₅ | Cl | H | H | H | Br | decomposition 218 |
| 651 | SO₂OC₆H₅ | CH₃ | CH₂—COOC₂H₅ | Cl | H | H | H | Br | 199 |
| 652 | SO₂OC₆H₅ | CH₃ | C₂H₅ | Cl | H | H | H | 4-CH₃-C₆H₄-SO₃ | decomposition 213 |
| 653 | CN | CH₂C₆H₅ | CH₃ | Cl | H | H | H | CH₃OSO₃ | 213 |
| 654 | SO₂CH₃ | CH₃ | CH₃ | H | H | H | H | CH₃OSO₃ | 271 |
| 655 | COOH | CH₂C₆H₅ | CH₃ | Cl | H | H | H | CH₃OSO₃ | 233 |
| 656 | SO₂NHCH₃ | CH₃ | CH₂CN | Cl | H | H | H | Cl | 230 |
| 657 | SO₂NH—CH₂C₆H₅ | CH₂C₆H₅ | CH₃ | Cl | H | H | H | CH₃OSO₃ | decomposition 193 |
| 658 | SO₂NH—CH₂CH=CH₂ | CH₂CH=CH₂ | CH₃ | Cl | H | H | H | CH₃OSO₃ | 185 |
| 659 | SO₂OC₆H₅ | CH₃ | CH₂COOC₂H₅ | Cl | H | H | H | CH₃OSO₃ | 203 |
| 660 | SO₂CH₃ | CH₃ | CH₂COOC₂H₅ | Cl | H | CH₃ | H | Br | 225 |
| 661 | SO₂NH₂ | n-C₄H₉ | CH₂CN | Cl | H | H | H | Cl | 153 |
| 662 | SO₂NHCH₃ | CH₃ | CH₂COOC₂H₅ | Cl | H | H | H | Br | decomposition 222 |
| 663 | CN | CH₃ | CH₂COOC₂H₅ | Cl | H | H | H | Br | decomposition 207 |
| 664 | COOCH₃ | CH₃ | CH₂COOC₂H₅ | Cl | H | H | H | Br | 209 |
| 665 | SO₂NHCH₂CH₂OCH₃ | CH₃ | CH₂COOC₂H₅ | Cl | H | H | H | Br | 212 |
| 666 | SO₂NHCH₂CH₂OCH₃ | CH₃ | CH₂CN | Cl | H | H | H | Cl | decomposition 180 |
| 667 | SO₂OC₆H₅ | CH₂CN | CH₃ | Cl | H | H | H | CH₃OSO₃ | decomposition 243 |
| 668 | SO₂OC₆H₅ | CH₂COOCH₃ | CH₃ | Cl | H | H | H | CH₃OSO₃ | 169 |
| 669 | SO₂OC₆H₅ | CH₃ | CH₃ | CH₃ | H | H | H | CH₃OSO₃ | decomposition 220 |
| 670 | SO₂CH₃ | CH₃ | CH₂CONH₂ | Cl | H | H | H | Cl | 310 |
| 671 | SO₂OC₆H₅ | CH₂COOH | CH₃ | Cl | H | H | H | CH₃OSO₃ | 194 |

If the quaternisation with dimethyl sulphate is not carried out in dimethylformamide at 120° C., the solvents and temperatures indicated in Table V below are used, a reaction time of about 2 hours being maintained (unless specifically indicated otherwise).

TABLE V

| Solvent | Temperature | Compound No. |
|---|---|---|
| Dioxane | reflux | 605, 614, 618, 622, 626, 632, 633, 634, 635 |
| Anisole/DMF | 120° C. | 608, 612, 617, 619, 624, 627, 629, 639, 648 |
| Anisole | 120° C. | 609, 616, 621, 630, 636, 671 |
| Chlorobenzene | 120° C. | 610, 611, 642, 643, 646, 653, 654, 657, 658, 667 |
| Dioxane/DMF | reflux | 620 |
| Xylene | 120° C. | 631, 645, 659, 668, 669 |
| DMF | 100° C. | 647 |

Twice the amount of dimethyl sulphate was employed in order to prepare the compound of the formula (644).

When mixtures with dimethylformamide were used, dimethylformamide was in each case added to the other solvent until the starting material just went into solution at the desired temperature. The quaternisation product frequently already precipitates from the hot reaction mixture.

For the preparation of the compound of the formula (603), the stoichiometric amount of triethanolamine was first added to the suspension of the sparingly soluble starting material of the formula (405) in dimethylformamide, so that the starting material goes into solution in the form of the triethanolamine salt. The dimethyl sulphate was then added at room temperature and the solution was stirred for ½ hour at 60° C. and for ½ hour at 100° C., whereupon the quaternisation product precipitated out.

The compound of the formula (613) was obtained by refluxing (201) in ethylene chlorohydrin for 12 hours and recrystallising the reaction product from water. In an analogous manner, (641) was prepared using chloroacetonitrile at the reflux temperature, (650) was prepared using benzyl bromide at 130° C. and (651) was prepared using ethyl bromoacetate at 100° C., the reaction time in each case being 2 hours.

In order to prepare the compounds of the formulae (670), (649) and (652), (201) and (204) were refluxed overnight in chlorobenzene with a 10-fold excess of chloracetamide and, respectively, with ethyl p-toluenesulphonate (25% excess).

The compounds of the formulae (656), (661) and (666) were obtained by boiling the compounds of the formulae (208), (301) and (237) respectively with chloroacetonitrile overnight. The compounds (662), (663) and (664) were prepared correspondingly from the compounds (208), (211) and (222) respectively in ethyl bromoacetate at 100° C. in the course of 2 hours, whilst in order to prepare compound (665), the reaction was carried out for 15 minutes at 140° C. Compound (660) was prepared in chlorobenzene at 120° C.

If a quaternisation product could not be separated out from the reaction mixture, or could be separated out only as an oil, for example compound (615) or (638), the reaction mixture was completely evaporated in vacuo and the residue was crystallised from a suitable solvent, such as water, ethanol, n-propanol or mixtures thereof.

The compounds of the formula

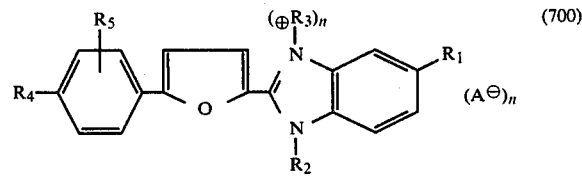

(700)

in which $R_1$ to $R_5$, A and n are as defined in Table VI, can be prepared in a similar manner, using corresponding starting materials and, where appropriate, quaternising agents.

TABLE VI

| Compound No. | n | $R_1$ | $R_2$ | $R_3$ | $R_4$ | $R_5$ | A |
|---|---|---|---|---|---|---|---|
| 701 | 0 | $SO_2OC_6H_4$-p-Cl | $CH_3$ | — | Cl | H | — |
| 702 | 1 | $SO_2OC_6H_4$-p-Cl | $CH_3$ | $CH_3$ | Cl | H | $CH_3SO_4$ |
| 703 | 0 | $SO_2OC_6H_4$-o-$OCH_3$ | $CH_3$ | — | Cl | H | — |
| 704 | 1 | $SO_2OC_6H_4$-o-$OCH_3$ | $CH_3$ | $CH_3$ | Cl | H | $CH_3SO_4$ |
| 705 | 0 | $SO_2C_6H_5$ | $C_2H_5$ | — | Cl | H | — |
| 706 | 1 | $SO_2C_6H_5$ | $C_2H_5$ | $CH_3$ | Cl | H | $CH_3SO_4$ |
| 707 | 0 | $SO_2CH_2C_6H_5$ | $CH_3$ | — | Cl | H | — |
| 708 | 1 | $SO_2CH_2C_6H_5$ | $CH_3$ | $CH_3$ | Cl | H | $CH_3SO_4$ |
| 709 | 0 | $SO_2OC_6H_5$ | $CH_3$ | — | $CH_3$ | 3-Cl | — |
| 710 | 1 | $SO_2OC_6H_5$ | $CH_3$ | $CH_3$ | $CH_3$ | 3-Cl | $CH_3SO_4$ |
| 711 | 0 | CN | $C_2H_5$ | — | Cl | H | — |
| 712 | 1 | CN | $C_2H_5$ | $CH_3$ | Cl | H | $CH_3SO_4$ |
| 713 | 0 | $COOC_6H_5$ | $CH_3$ | — | Cl | H | — |
| 714 | 1 | $COOC_6H_5$ | $CH_3$ | $CH_3$ | Cl | H | $CH_3SO_4$ |
| 715 | 0 | 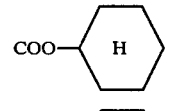 | $CH_3$ | — | Cl | H | — |
| 716 | 1 | 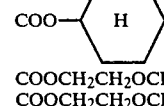 | $CH_3$ | $CH_3$ | Cl | H | $CH_3SO_4$ |
| 717 | 0 | $COOCH_2CH_2OCH_3$ | $CH_3$ | — | Cl | H | — |
| 718 | 1 | $COOCH_2CH_2OCH_3$ | $CH_3$ | $CH_3$ | Cl | H | $CH_3SO_4$ |
| 719 | 0 | $COOCH_2CH_2OC_6H_5$ | $CH_3$ | — | Cl | H | — |
| 720 | 1 | $COOCH_2CH_2OC_6H_5$ | $CH_3$ | $CH_3$ | Cl | H | $CH_3SO_4$ |
| 721 | 0 | $COOCH_2C_6H_5$ | $CH_3$ | — | Cl | H | — |
| 722 | 1 | $COOCH_2C_6H_5$ | $CH_3$ | $CH_3$ | Cl | H | $CH_3SO_4$ |

TABLE VI-continued

| Compound No. | n | R₁ | R₂ | R₃ | R₄ | R₅ | A |
|---|---|---|---|---|---|---|---|
| 723 | 0 | COOCH₂CH=CH₂ | CH₃ | — | Cl | H | — |
| 724 | 1 | COOCH₂CH=CH₂ | CH₃ | CH₃ | Cl | H | CH₃SO₄ |
| 725 | 0 | SO₂NHCH₂CH₂OC₆H₅ | CH₃ | — | Cl | H | — |
| 726 | 1 | SO₂NHCH₂CH₂OC₆H₅ | CH₃ | CH₃ | Cl | H | CH₃SO₄ |
| 727 | 0 | CONH₂ | CH₃ | — | Cl | H | — |
| 728 | 1 | CONH₂ | CH₃ | CH₃ | Cl | H | CH₃SO₄ |
| 729 | 0 | CONH₂ | C₂H₅ | — | Cl | H | — |
| 730 | 1 | CONH₂ | C₂H₅ | CH₃ | Cl | H | CH₃SO₄ |
| 731 | 0 | CONHCH₂CH₂OCH₃ | CH₃ | — | Cl | H | — |
| 732 | 1 | CONHCH₂CH₂OCH₃ | CH₃ | CH₃ | Cl | H | CH₃SO₄ |
| 733 | 0 | CONH(CH₂)₃N(CH₃)₂ | CH₃ | — | Cl | H | — |
| 734 | 1 | CONH(CH₂)₃N⊕(CH₃)₃ | CH₃ | CH₃ | Cl | H | 2 CH₃SO₄ |
| 735 | 0 | CONH—CH₂C₆H₅ | CH₂C₆H₅ | — | Cl | H | — |
| 736 | 1 | CONH-CH₂C₆H₅ | CH₂C₆H₅ | CH₃ | Cl | H | 2 CH₃SO₄ |
| 737 | 0 | SO₂N(CH₂CH₂)₂O | CH₃ | — | Cl | H | — |
| 738 | 1 | SO₂N(CH₂CH₂)₂O | CH₃ | CH₃ | Cl | H | CH₃SO₄ |
| 739 | 0 | CON(CH₂CH₂)₂O | CH₃ | — | Cl | H | — |
| 740 | 1 | CON(CH₂CH₂)₂O | CH₃ | CH₃ | Cl | H | CH₃SO₄ |
| 741 | 0 | SO₂CH₃ | n-C₄H₉ | — | Cl | H | — |
| 742 | 1 | SO₂CH₃ | n-C₄H₉ | CH₃ | Cl | H | CH₃SO₄ |
| 743 | 1 | SO₂CH₃ | CH₃ | CH₂C₆H₅ | Cl | H | Br |
| 744 | 1 | CN | CH₃ | CH₂C₆H₅ | Cl | H | Br |
| 745 | 1 | SO₂OCH₂CH₂OCH₃ | n-C₄H₉ | CH₃ | Cl | H | CH₃SO₄ |
| 746 | 0 | SO₂NHCH₂CH₂OCH₃ | CH₂CH₂OCH₃ | — | Cl | H | — |
| 747 | 1 | SO₂CH₃ | CH₃ | CH₂COOC(CH₃)₃ | Cl | H | Br |
| 748 | 1 | SO₂CH₃ | CH₃ | CH₂CH=CH₂ | Cl | H | I |
| 749 | 0 | SO₂OC₆H₄-pC(CH₃)₃ | CH₃ | — | Cl | H | — |
| 750 | 1 | SO₂OC₆H₄-pC(CH₃)₃ | CH₃ | CH₃ | Cl | H | CH₃SO₄ |
| 751 | 0 | SO₂CH₂C₆H₅ | CH₃ | — | Cl | H | — |
| 752 | 1 | SO₂CH₂C₆H₅ | CH₃ | CH₃ | Cl | H | CH₃SO₄ |
| 753 | 0 | SO₂OC₆H₅ | CH₃ | — | CONHCH₃ | H | — |
| 754 | 1 | SO₂OC₆H₅ | CH₃ | CH₃ | CONHCH₃ | H | CH₃SO₄ |
| 755 | 0 | CN | CH₃ | — | H | H | — |
| 756 | 1 | CN | CH₃ | CH₃ | H | H | CH₃SO₄ |
| 757 | 0 | COOC₂H₅ | CH₂CN | — | H | H | — |
| 758 | 1 | COOC₂H₅ | CH₂CN | CH₃ | H | H | CH₃SO₄ |
| 759 | 0 | SO₂CH₃ | CH₃ | — | H | H | — |
| 760 | 1 | SO₂CH₃ | CH₃ | CH₂CN | H | H | Cl |
| 761 | 0 | SO₂OC₆H₅ | CH₃ | — | Cl | 2-CH₃ | — |
| 762 | 1 | SO₂OC₆H₅ | CH₃ | CH₃ | Cl | 2-CH₃ | CH₃SO₄ |
| 763 | 0 | COO(CH₂)₃N(CH₃)₂ | CH₃ | — | Cl | H | — |
| 764 | 0 | SO₂OC₆H₃-2,4-diCl | CH₃ | — | Cl | H | — |
| 765 | 1 | SO₂OC₆H₃-2,4-diCl | CH₃ | CH₃ | Cl | H | CH₃SO₄ |
| 766 | 0 | SO₂OC₆H₃-2,4-diCH₃ | CH₃ | — | Cl | H | — |
| 767 | 1 | SO₂OC₆H₃-2,4-diCH₃ | CH₃ | CH₃ | Cl | H | CH₃SO₄ |
| 768 | 1 | SO₂OC₆H₅ | CH₃ | CH₂CN | Cl | H | Cl |
| 769 | 1 | CN | CH₂CN | CH₃ | Cl | H | CH₃SO₄ |

EXAMPLE 7

7.5 g of the compound of the formula (228) are stirred overnight at the reflux temperature in 35 ml of acrylonitrile and 5 ml of N,N,N′,N′-tetramethyl-1,3-diaminobutane. After cooling, the reaction mixture is filtered and the colourless residue is washed repeatedly with methanol and dried in vacuo. This gives 8.2 g (96% of theory) of a mixture of isomers (examination by NMR) of the formula

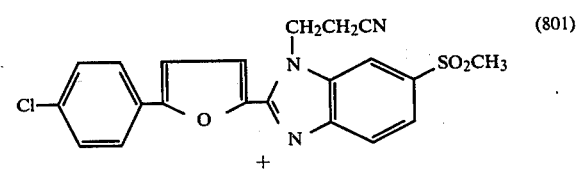

(801)

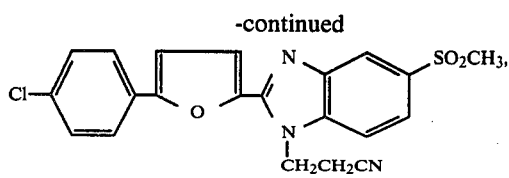

which can be recrystallised from o-dichlorobenzene. Melting point 222° C.

3.9 of this product are dissolved in 70 ml of anisole and 1.05 ml of dimethyl sulphate are added dropwise to the solution at 120° C., with stirring. The mixture is stirred for a further 2 hours at this temperature and allowed to cool and the product which has precipitated out is filtered off, washed with anisole and isopropanol and dried. In order to separate it from unconverted starting material, the product is extracted with boiling water and the water-soluble fraction is completely evaporated in vacuo and boiled thoroughly with acetone. This gives 1.5 g of a mixture of isomers of the formula

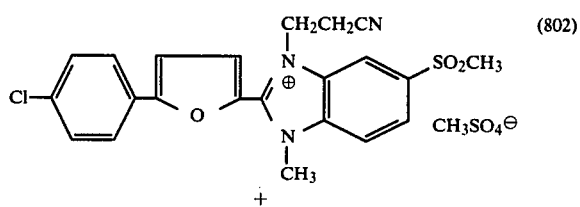

having a melting point of 220° C. (decomposition).

If the procedure described above is repeated, except that acrylonitrile is replaced by chloroacetonitrile and N,N,N',N'-tetramethyl-1,3-diaminobutane is replaced by potassium carbonate [1.05 mols per mol of the compound of the formula (228)], this gives a mixture of the compounds of the formula

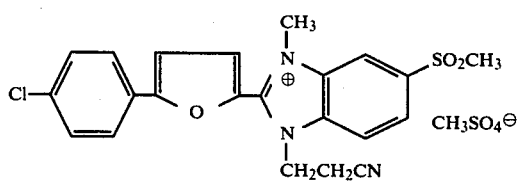

(melting point 202° C. after recrystallisation from anisole and n-butanol) and this is converted, by quaternisation with dimethyl sulphate, to a mixture of isomers of the formula

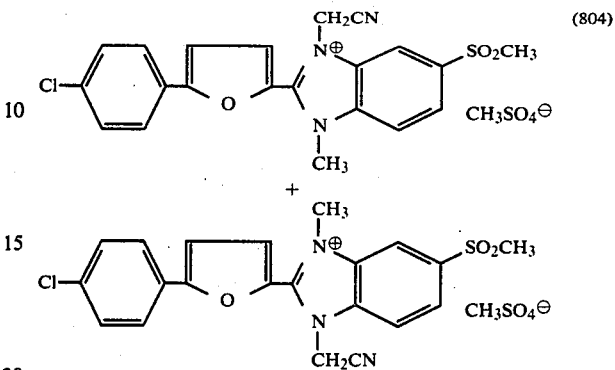

(melting point 153° C., decomposition).

EXAMPLE 8

1.14 ml of dimethyl sulphate are added dropwise, at 100° C., to a solution of 4.73 g of the compound of the formula (243) in 50 ml of dioxane and 30 ml of chlorobenzene. After the dropwise addition is complete, the mixture is stirred at this temperature for a further 1 hour and the product is filtered off hot with suction and repeatedly washed with toluene. This gives 5.7 g (95% of theory) of the compound of the formula

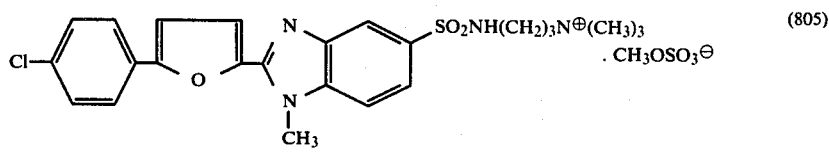

which can be recrystallised from alcohol (melting point 129° C.).

The compounds of the formula

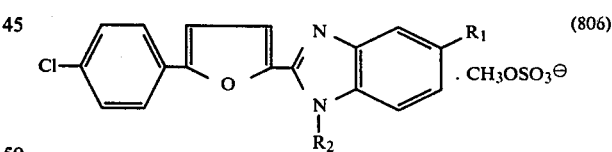

can be prepared in a similar manner.

TABLE VII

| Compound No. | $R_1$ | $R_2$ |
| --- | --- | --- |
| (807) | $CONH(CH_2)_3N^{\oplus}(CH_3)_3$ | $CH_3$ |
| (808) | $COOCH_2CH_2N^{\oplus}(CH_3)_3$ | $CH_3$ |
| (809) | $SO_2NH(CH_2)_2N^{\oplus}(CH_3)_3$ | $CH_3$ |
| (810) | $SO_2NH(CH_2)_3N^{\oplus}(CH_3)_3$ | $CH_2C_6H_5$ |
| (811) | $SO_2NH(CH_2)_3N^{\oplus}(CH_3)_3$ | $CH_2CH_2CN$ |
| (812) | $SO_2NH(CH_2)_3-\overset{\oplus}{N}\underset{CH_3}{\diagup\diagdown}O$ | $CH_3$ |
| (813) | $SO_2N\diagup\diagdown N^{\oplus}=(CH_3)_2$ | $CH_3$ |

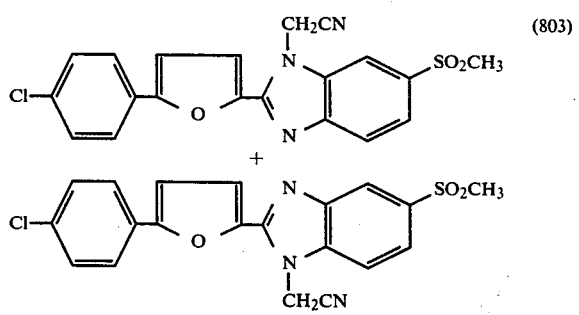

TABLE VII-continued

| Compound No. | R₁ | R₂ |
|---|---|---|
| (814) | $SO_2N-(CH_2)_3-\overset{CH_3}{\underset{CH_2CH_2CN}{\overset{|}{\underset{|}{N^{\oplus}}}}}-C_2H_5$ | $CH_3$ |

EXAMPLE 9

0.2 g of sodium nitrate, 0.2 g of 80% pure sodium chlorite and 0.2 g of oxalic acid or an equivalent amount of another organic or inorganic acid suitable for this purpose are added to 100 ml of water. A solution of the fluorescent brightener of the formula (601) is prepared by dissolving 1 g of the said fluorescent brightener in 1,000 ml of water. 1.5 ml of this stock solution are added to the solution described above. This liquor is warmed to 60° C. and polyacrylonitrile fabric weighing 3 g is then added, the temperature is raised to 95° to 98° C. in the course of 10 to 15 minutes and the bath is kept at this temperature for 60 minutes. The fabric is then rinsed in cold water and dried for 20 minutes at 60° C. The fabric treated in this way displays a pronounced white effect of good fastness to light. Similar effects are obtained with the compounds of the formulae (101), (201), (203), (204), (208), (210), (211), (215), (219), (222), (223), (229), (230), (231), (234), (235), (237), (238) to (241), (243), (244), (246), (248), (250), (301), (502), (605), (606), (609) to (614), (617), (620), (624), (625), (630), (632) to (635), (637) to (643), (646), (648), (649), (650), (652) to (658), (801), (802) and (805).

EXAMPLE 10

0.1 g of oxalic acid, 0.1 g of sodium acetate, 0.0125 g of sodium bisulphite and 0.025 g of a polyphosphate as a complex-forming agent are added to 100 ml of water. A solution of the fluorescent brightener of the formula (601) is prepared by dissolving 1 g in 1,000 ml of water. 6 ml of this stock solution are added to the solution described above. The aqueous liquor containing the fluorescent brightener is warmed to 60° C. and a hank of modified polyacrylonitrile ("Courtelle") weighing 3 g is put into the liquor. The temperature is raised to 98° C. in the course of 10 to 15 minutes and the material is treated at this temperature for 30 minutes. The material is then rinsed with cold water and dried. The fibrous material treated in this way displays a pronounced white effect of good fastness to light. A similar effect is obtained with the compounds of the formulae (605), (606), (609) to (613), (617), (620), (624), (625), (626), (630) to (636), (638) to (643), (646), (648), (649) to (658) and (802).

EXAMPLE 11

An aqueous solution is prepared which contains 0.3% of the fluorescent brightener of the formula (601), based on the weight of the material to be brightened. This solution is warmed to 30° C. Modified polyester fabric (®Dacron 64) produced by co-condensation with 2 to 5 mol % of the 5-(sodium sulphonate) of isophthalic acid, is then put into to the solution, a liquor ratio of 1:25 being maintained. The temperature is raised to 120° C. in the course of 30 minutes and the bath is kept at this temperature for 30 minutes. It is then cooled to 80° C. in the course of 15 minutes. The fabric is then rinsed in running cold water and subsequently dried at 180° C. using an iron. It displays a pronounced white effect. A similar effect is obtained with the compounds of the formulae (604), (606), (610) to (614), (616), (617), (620), (624), (626), (630), (631) to (636), (639), (640), (642), (643), (646), (650) to (654), (657) and (658).

EXAMPLE 12

Freshly spun stretched polyacrylonitrile wet tow (corresponding to a dry weight of 3.0 g) is immersed, whilst still wet, for 10 seconds, at 20° C., in 100 ml of an aqueous liquor which contains 0.0005% of the fluorescent brightener of the formula (601), (605) or (624) and has been adjusted to a pH of 4 with concentrated oxalic acid solution. The wet tow is then rinsed briefly with water and dried at 90° to 100° C. A good white effect on the polyacrylonitrile fibre is obtained in this way.

Brightening can also be effected, for example, at pH 6 (adjusted by adding sodium acetate). Raising the temperature of the dye liquor, for example to 40° C., increases the rate of exhaustion.

Higher white effects are achieved by increasing the concentration of fluorescent brightener, for example to 0.005%.

EXAMPLE 13

Using a liquor ratio of 1:30 to 1:40, a fabric of cellulose acetate is put, at 50° C., into an aqueous bath which contains 0.15% of the compound of the formula (605), based on the fibrous material. The temperature of the treatment bath is brought to 90° to 95° C. and this temperature is maintained for 30 to 45 minutes. After rinsing and drying, a good white effect is obtained. Similar effects are obtained with the compounds of the formulae (610), (611), (630), (632), (633), (646) and (649) to (653).

EXAMPLE 14

Using a liquor ratio of 1:30, a polyamide-6 fabric is put wet, at 30° C., into an aqueous bath which is at a pH of 9.5 and contains 0.2% of the compound of the formula (601), based on the fibrous material. The temperature is brought to 60° C. in the course of 10 minutes and this temperature is maintained for 20 minutes. After rinsing and drying, the treated fabric is ironed at 180° C. It displays a good white effect. Similar effects are obtained with the compounds of the formulae (605), (609) to (614), (617), (624), (626), (630), (631), (633) to (636), (639), (640), (642), (643), (646), (648), (652), (653), (654), (657) or (658).

EXAMPLE 15

An aqueous suspension of 100 parts of cellulose in 4,000 parts of soft water is mixed in a beater with an aqueous solution of 0.1 part of the fluorescent brightener of the formula (601) for 15 minutes, two parts of resin milk and 3 parts of aluminium sulphate are added, the pulp is diluted with 20,000 parts of backwater, which contains 1 g of aluminium sulphate per liter, and the resulting pulp is processed in a conventional manner to paper sheets. The resulting paper sheets are strongly whitened.

EXAMPLE 16

2 g of the fluorescent brightener of the formula (601) are dissolved in about 50 ml of hot distilled water. In addition, 80 g of a degraded starch are dissolved in 1,000 ml of water at 90° C. to give a colloidal solution. The brightener solution is then worked into the starch solution. The resulting solution can have a pH value of 5.5 to 7. Using this size liquor, the surface of a sized printing paper is coated in a size press and the coated paper is dried at about 90° to 120° C. in the dryer part of the paper machine. This gives a paper of considerably improved whiteness.

EXAMPLE 17

An intimate mixture of 65 parts of polyvinyl cloride (suspension type), 32 parts of dioctyl phthalate, 3 parts of an epoxidised soya bean oil, 1.5 parts of a stabiliser (for example ®Irgastab BC 26), 0.5 part of a co-stabiliser (for example ®Irgastab CH 300), 5 parts of TiO₂ (rutile type) and 91 parts of the compound of the formula (605) is milled on a calender at 150° C. to give a film. The resulting film displays a pronounced white effect. Similar effects are obtained with the compounds of the formulae (611), (624), (626) and (630).

EXAMPLE 18

An aqueous solution is prepared which contains 0.3 g of the fluorescent brightener of the formula (611), 0.3 g of an adduct of 35 mols of ethylene oxide and 1 mol of stearyl alcohol, 0.3 g of an adduct of 8 mols of ethylene oxide and 1 mol of p-tert.-octylphenol, 270 ml of deionised water and 30 ml of ethanol (95%). Cellulose acetate fabric weighing 8 g is padded in this solution (liquor pick-up 60%). The treated fabric is then dried in a drying cabinet at 70° C. The fabric displays a good white effect. Similar effects are obtained with the compounds of the formulae (612), (617), (624), (637), (639), (642), (643) and (654).

What is claimed is:

1. A 2-phenyl-5-benzimidazol-2'-yl-furane of the formula

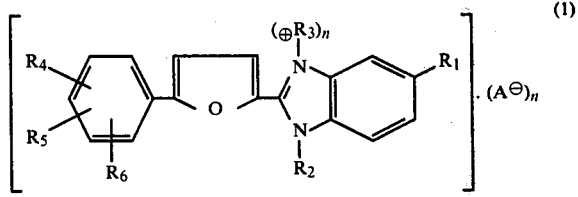

in which $R_1$ is a sulphonic acid group or an ester or amide thereof, a carboxylic acid group or an ester or amide thereof, a cyano group, a trifluoromethyl group or an alkyl- or aryl-sulphonyl group, $R_2$ is alkyl having 1 to 8 carbon atoms, alkenyl having 3 or 4 carbon atoms, cyclohexyl, hydroxyalkyl having 2 to 4 carbon atoms, alkoxyalkyl having a total of 3 to 6 carbon atoms, carboxyalkyl having 2 to 6 carbon atoms, carbalkoxyalkyl having a total of 3 to 6 carbon atoms, cyanoalkyl having 2 to 4 carbon atoms, carbamoylalkyl which has 1 to 6 carbon atoms in the alkyl moiety and is unsubstituted or substituted on the nitrogen atom by 1 or 2 alkyl having 1 to 3 carbon atoms, benzyl which is unsubstituted or substituted by chlorine, methyl or methoxy, dialkylaminoalkyl having a total of 3 to 7 carbon atoms or phenethyl and, if n is the number 0, also hydrogen, $R_3$ is hydrogen, alkyl having 1 to 6 carbon atoms, hydroxyalkyl having 2 or 3 carbon atoms, cyanoalkyl having 2 to 4 carbon atoms, carboxyalkyl having 2 or 3 carbon atoms, carbamoylmethyl which is unsubstituted or substituted on the nitrogen atom by 1 or 2 alkyl having 1 to 3 carbon atoms, alkoxycarbonylalkyl having a total of 3 to 6 carbon atoms, alkenyl having 3 or 4 carbon atoms or benzyl which is unsubstituted or substituted by chlorine or methyl, $R_4$ is hydrogen, chlorine, bromine, fluorine, carboxyl, carbalkoxy having a total of 2 to 5 carbon atoms, alkoxyalkoxycarbonyl having a total of 4 to 6 carbon atoms, benzyloxycarbonyl, cyano, sulpho, alkylsulphonyl having 1 to 4 carbon atoms, carbamoyl or sulphamoyl which are unsubstituted or substituted by 1 or 2 alkyl groups having 1 to 4 carbon atoms, or sulphonic acid phenyl ester or trifluoromethyl, $R_5$ is hydrogen, chlorine or methyl, $R_6$ is hydrogen or chlorine, n is the number 0 or 1 and $A^\ominus$ is a colourless anion equivalent to the cation of the fluorescent brightener.

2. A 2-phenyl-5-benzimidazol-2'-yl-furane according to claim 1, of the formula

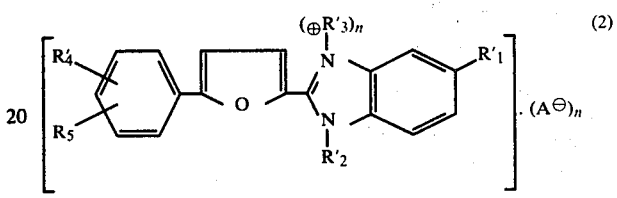

in which $R_1'$ is a sulphonic acid group, a sulphonic acid alkyl ester having 1 to 8 carbon atoms, a sulphonic acid cyclohexyl ester, a sulphonic acid alkoxyalkyl ester having a total of 2 to 8 carbon atoms, a sulphonic acid phenoxyalkyl ester or phenylalkyl ester having 1 to 3 carbon atoms in the alkyl moiety, a sulphonic acid chloroalkyl ester having 1 to 4 carbon atoms, a sulphonic acid alkenyl ester having 3 or 4 carbon atoms, alkylsulphonyl having 1 to 4 carbon atoms, benzylsulphonyl, phenylsulphonyl which is unsubstituted or substituted by methyl or chlorine, cyano, trifluoromethyl or $-COOY_1$, $-SO_2NY_1Y_2$ or $-CONY_1Y_2$, in which $Y_1$ is hydrogen, alkyl having 1 to 8 carbon atoms, alkenyl having 3 or 4 carbon atoms, cyclohexyl, hydroxyalkyl having 2 to 4 carbon atoms, alkoxyalkyl having a total of 3 to 6 carbon atoms, carboxyalkyl having 2 to 6 carbon atoms, carbalkoxyalkyl having a total of 3 to 6 carbon atoms, cyanoalkyl having 2 to 4 carbon atoms, benzyl which is unsubstituted or substituted by chlorine, methyl or methoxy, phenyl which is unsubstituted or substituted by chlorine, methyl or methoxy, dialkylaminoalkyl having a total of 3 to 7 carbon atoms, N-cyano-ethyl-N-alkylaminoalkyl having a total of 7 to 10 carbon atoms, N-morpholino-, N-piperidino- or N-pyrrolidino-alkyl having 2 or 3 carbon atoms in the alkyl moiety, which can be quaternised or protonated by $R_3$, or phenethyl and $Y_2$ is hydrogen, alkyl having 1 to 4 carbon atoms, alkenyl having 3 or 4 carbon atoms or hydroxyalkyl having 2 to 4 carbon atoms, and $Y_1$ and $Y_2$ together with the nitrogen atom are a piperidine ring, pyrrolidine ring or N-alkylpiperazine ring having 1 to 3 carbon atoms in the alkyl moiety, or a morpholine ring which is unsubstituted or substituted by 1 or 2 methyl groups, or the grouping

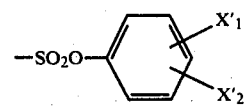

in which $X_1'$ is hydrogen, alkyl having 1 to 4 carbon atoms, chlorine, alkoxy having 1 to 4 carbon atoms, carboxyl, carbalkoxy having 2 to 5 carbon atoms or phenyl and $X_2'$ is hydrogen, methyl, methoxy or chlorine, $R_2'$ is alkyl having 1 to 8 carbon atoms, alkenyl having 3 or 4 carbon atoms, carbamoylalkyl having a total of 2 to 6 carbon atoms, hydroxyalkyl having 2 to 4 carbon atoms, alkoxyalkyl having a total of 3 to 6 carbon atoms, carboxyalkyl having 2 to 6 carbon atoms, carbalkoxyalkyl having a total of 3 to 6 carbon atoms, cyanoalkyl having 2 to 4 carbon atoms, benzyl which is unsubstituted or substituted by chlorine, methyl or methoxy, dialkylaminoalkyl having a total of 3 to 7 carbon atoms or phenethyl and, if n is the number 0, also hydrogen, $R_3'$ is hydrogen, alkyl having 1 to 6 carbon atoms, hydroxyalkyl having 2 or 3 carbon atoms, cyanoalkyl having 2 to 4 carbon atoms, carboxymethyl, carbamoylmethyl, alkoxycarbonylmethyl having a total of 3 to 6 carbon atoms, alkenyl having 3 or 4 carbon atoms or benzyl which is unsubstituted or substituted by chlorine or methyl, $R_4'$ is hydrogen, chlorine, bromine, fluorine, carboxyl, carbalkoxy having a total of 2 to 5 carbon atoms, alkoxyalkoxycarbonyl having a total of 4 to 6 carbon atoms, benzyloxycarbonyl, cyano, sulpho, alkylsulphonyl having 1 to 4 carbon atoms, carbamoyl or sulphamoyl which are unsubstituted or substituted by alkyl having 1 to 4 carbon atoms, or sulphonic acid phenyl ester or trifluoromethyl, $R_5$ is hydrogen, chlorine or methyl, n is the number 0 or 1 and $A^\ominus$ is a colourless anion equivalent to the cation of the fluorescent brightener.

3. A 2-phenyl-5-benzimidazol-2'-yl-furane according to claim 2, of the formula

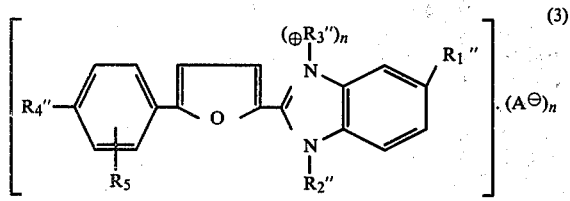

in which $R_1''$ is alkylsulphonyl having 1 to 4 carbon atoms, phenylsulphonyl, benzylsulphonyl, trifluoromethyl, cyano or —$CONY_1'Y_2'$ or —$SO_2NY_1'Y_2'$, in which $Y_1'$ is hydrogen, alkyl having 1 to 4 carbon atoms, alkenyl having 3 or 4 carbon atoms, hydroxyalkyl having 2 to 4 carbon atoms, cyclohexyl, alkoxyalkyl having a total of 3 to 6 carbon atoms, benzyl or dialkylaminoalkyl having a total of 3 to 7 carbon atoms, which can be quaternised or protonated by $R_3''$, and $Y_2'$ is hydrogen, alkyl having 1 to 3 carbon atoms or alkenyl having 3 or 4 carbon atoms, and $Y_1'$ and $Y_2'$ together with the nitrogen atom are a piperidine ring, a N-alkylpiperazine ring having 1 to 3 carbon atoms in the alkyl moiety or a morpholine ring, or a sulphonic acid alkyl ester having 1 to 4 carbon atoms which is unsubstituted or substituted by alkoxy having 1 to 4 carbon atoms, or the grouping

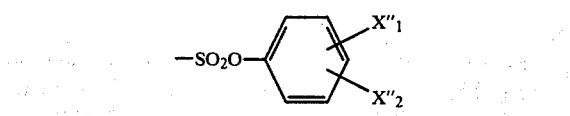

in which $X_1''$ is hydrogen, alkyl having 1 to 4 carbon atoms, chlorine, methoxy, carboxyl, carbalkoxy having 2 to 5 carbon atoms or phenyl and $X_2''$ is hydrogen, methyl or chlorine, $R_2''$ is alkyl having 1 to 4 carbon atoms, alkenyl having 3 or 4 carbon atoms, cyanoalkyl having 2 to 4 carbon atoms, carbalkoxyalkyl having a total of 3 to 6 carbon atoms, carbamoylmethyl, carboxymethyl or benzyl and, if n is the number 0, also hydrogen, $R_3''$ is hydrogen, alkyl having 1 to 4 carbon atoms, hydroxyalkyl having 2 or 3 carbon atoms, alkenyl having 3 or 4 carbon atoms, cyanoalkyl having 2 to 4 carbon atoms, alkoxycarbonylalkyl having a total of 3 to 6 carbon atoms, carbamoylmethyl or benzyl, $R_4''$ is hydrogen, chlorine, carbalkoxy having 2 to 5 carbon atoms or carbamoyl which is unsubstituted or substituted by alkyl having 1 to 4 carbon atoms, $R_5$ is hydrogen, chlorine or methyl, n is the number 0 or 1 and $A^\ominus$ is a colourless anion equivalent to the cation of the fluorescent brightener.

4. A 2-phenyl-5-benzimidazol-2'-yl-furane according to claim 3, of the formula

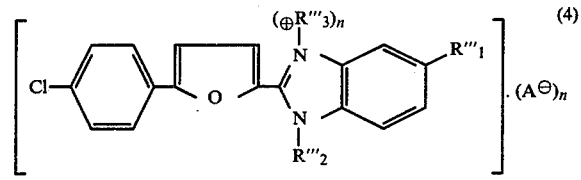

in which $R_1'''$ is a sulphonic acid alkoxyalkyl ester having a total of 2 to 6 carbon atoms, a sulphonic acid alkyl ester having 1 to 4 carbon atoms, alkylsulphonyl having 1 to 4 carbon atoms, phenylsulphonyl, cyano or —$CONY_1''Y_2''$ or —$SO_2NY_1''Y_2''$, in which $Y_1''$ is hydrogen, alkyl having 1 to 4 carbon atoms, alkenyl having 3 or 4 carbon atoms, hydroxyalkyl having 2 to 4 carbon atoms, alkoxyalkyl having a total of 3 to 6 carbon atoms, benzyl or dialkylaminoalkyl having a total of 3 to 7 carbon atoms, which can be quaternised or protonated by $R_3'''$, and $Y_2''$ is hydrogen or alkyl having 1 to 3 carbon atoms, and $Y_1''$ and $Y_2''$ together with the nitrogen atom are a morpholine ring, or the grouping

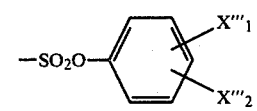

in which $X_1'''$ is hydrogen, alkyl having 1 to 4 carbon atoms, chlorine or methoxy and $X_2'''$ is hydrogen, methyl or chlorine, $R_2'''$ and $R_3'''$ independently of one another are alkyl having 1 to 4 carbon atoms, cyanoalkyl having 2 to 4 carbon atoms, alkoxycarbonylmethyl having 1 to 3 carbon atoms in the alkyl moiety, carbamoylmethyl or benzyl, n is the number 0 or 1 and $A^\ominus$ is a colourless anion equivalent to the cation of the fluorescent brightener.

5. A 2-phenyl-5-benzimidazol-2'-yl-furane according to claim 2, of the formula

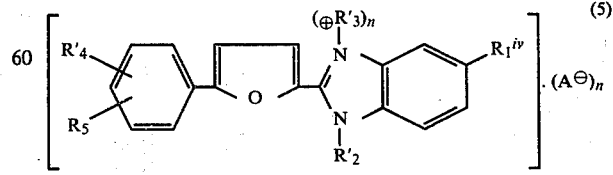

in which $R_1^{iv}$ is a sulphonic acid alkyl ester having 1 to 8 carbon atoms, a sulphonic acid cyclohexyl ester, a sulphonic acid alkoxyalkyl ester having a total of 2 to 8 carbon atoms, a sulphonic acid phenoxyalkyl ester or sulphonic acid phenylalkyl ester having 1 to 3 carbon atoms in the alkyl moiety, a sulphonic acid chloroalkyl ester having 1 to 4 carbon atoms, a sulphonic acid alkenyl ester having 3 or 4 carbon atoms, trifluoromethyl or the grouping

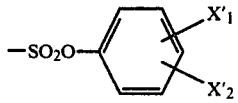

and $R_2'$, $R_3'$, $R_4'$, $R_5$, $X_1'$, $X_2'$, n and $A^\ominus$ are as defined in claim 2.

6. A 2-phenyl-5-benzimidazol-2'-yl-furane according to claim 3, of the formula

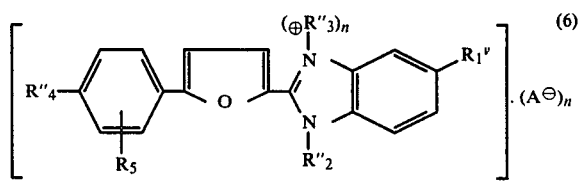

(6)

in which $R_1^\nu$ is a sulphonic acid alkyl ester having 1 to 4 carbon atoms which is unsubstituted or substituted by alkoxy having 1 to 4 carbon atoms, or trifluoromethyl or the grouping

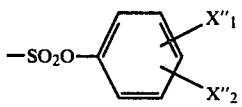

and $R_2''$, $R_3''$, $R_4''$, $R_5$, $X_1''$, $X_2''$, n and $A^\ominus$ are as defined in claim 3.

7. A 2-phenyl-5-benzimidazol-2'-yl-furane according to claim 4, of the formula (7)

in which $R_1^\nu$ is a sulphonic acid alkyl ester having 1 to 4 carbon atoms which is unsubstituted or substituted by alkoxy having 1 or 2 carbon atoms, or trifluoromethyl or the grouping

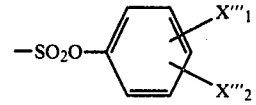

and $R_2'''$, $R_3'''$, $X_1'''$, $X_2'''$, n and $A^\ominus$ are as defined in claim 4.

8. A 2-phenyl-benzimidazol-2'-yl-furane according to claim 2, of the formula

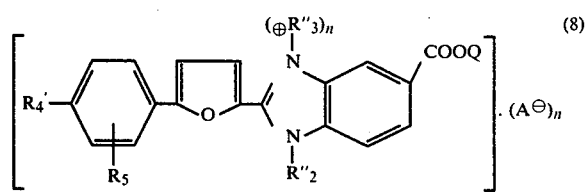

(8)

in which $R_2''$ is alkyl having 1 to 4 carbon atoms, alkenyl having 3 or 4 carbon atoms, cyanoalkyl having 2 to 4 carbon atoms, carbalkoxyalkyl having a total of 3 to 6 carbon atoms, carbamoylmethyl, carboxymethyl or benzyl and, if n is the number 0, also hydrogen, $R_3''$ is hydrogen, alkyl having 1 to 4 carbon atoms, hydroxyalkyl having 2 or 3 carbon atoms, alkenyl having 3 or 4 carbon atoms, cyanoalkyl having 2 to 4 carbon atoms, alkoxycarbonylalkyl having a total of 3 to 6 carbon atoms, carbamoylmethyl or benzyl and Q is hydrogen, alkyl having 1 to 4 carbon atoms, phenyl, cyclohexyl, alkenyl having 3 or 4 carbon atoms, alkoxyalkyl having a total of 3 to 6 carbon atoms, benzyl or dialkylaminoalkyl having a total of 3 to 7 carbon atoms, which can be quaternised or protonated by $R_3''$, and $R_4'$, $R_5$, n and $A^\ominus$ are as defined in claim 2.

9. A 2-phenyl-5-benzimidazol-2'-yl-furane according to claim 8, of the formula

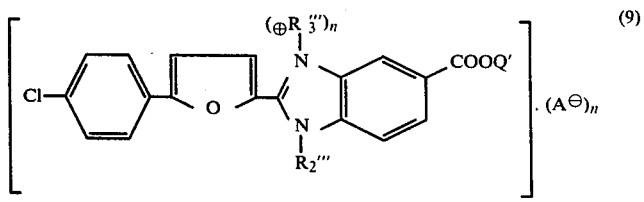

(9)

in which $R_2'''$ and $R_3'''$ independently of one another are alkyl having 1 to 4 carbon atoms, cyanoalkyl having 2 to 4 carbon atoms, alkoxycarbonylmethyl having 1 to 3 carbon atoms in the alkyl moiety, carbamoylmethyl or benzyl, and Q' is hydrogen or alkyl having 1 to 4 carbon atoms and n and $A^\ominus$ are as defined in claim 8.

10. A 2-phenyl-5-benzimidazol-2'-yl-furane according to claim 9, of the formula

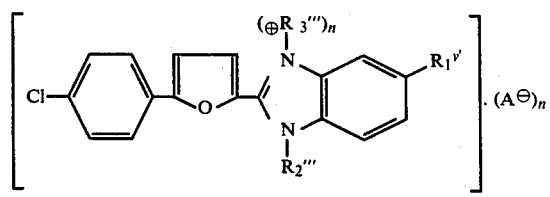

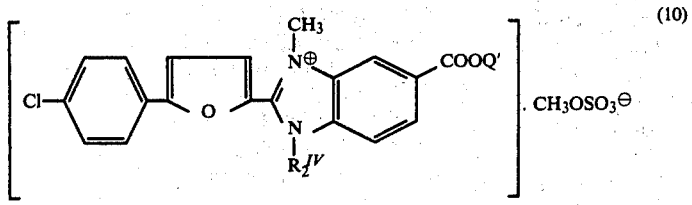

(10)

in which Q' is hydrogen or alkyl having 1 to 4 carbon atoms and $R_2'^v$ is methyl or benzyl.

11. A 2-phenyl-5-benzimidazol-2'-yl-furane according to claim 4, of the formula

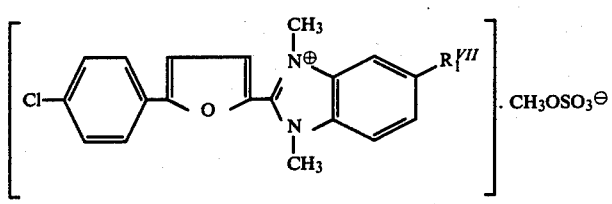

(11)

in which $R_1^{v''}$ is methylsulphonyl, phenylsulphonyl or cyano.

12. The 2-phenyl-5-benzimidazol-2'-yl-furane according to claim 4, of the formula

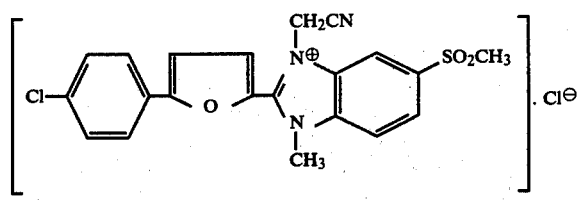

(12)

13. The 2-phenyl-5-benzimidazol-2'-yl-furane according to claim 7, of the formula

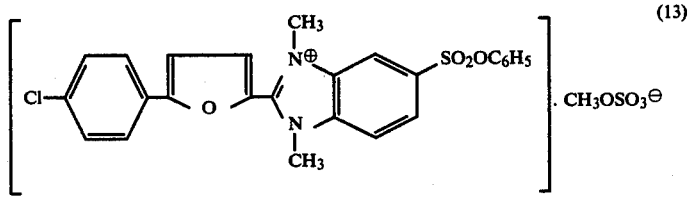

(13)

14. A 2-phenyl-5-benzimidazol-2'-yl-furane of the formula

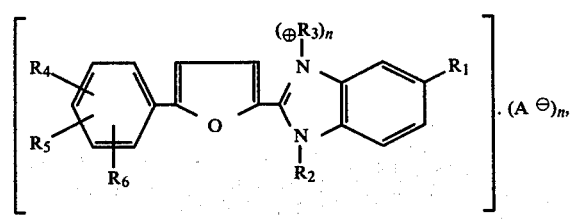

(A)

in which $R_1$ is a sulphonic acid group, a sulphonic acid phenyl ester and is unsubstituted or non-chromophoric substituted alkylsulphonyl having 1 to 4 carbon atoms, benzylsulphonyl, phenylsulphonyl which is unsubstituted or substituted by methyl or chlorine, cyano, trifluoromethyl, $-SO_2NY_1Y_2$ or $-CONY_1Y_2$, in which $Y_1$ is hydrogen, alkyl having 1 to 8 carbon atoms, alkenyl having 3 or 4 carbon atoms, cyclohexyl, hydroxyalkyl having 2 to 4 carbon atoms, alkoxyalkyl having a total of 3 to 6 carbon atoms, carboxyalkyl having 2 to 6 carbon atoms, carbalkoxyalkyl having a total of 3 to 6 carbon atoms, cyanoalkyl having 2 or 3 carbon atoms, benzyl, which is unsubstituted or substituted by methyl or methoxy, phenyl which is unsubstituted or substituted by chlorine, methyl or methoxy, dialkylaminoalkyl having a total of 3 to 7 carbon atoms or phenethyl, $Y_2$ is hydrogen, alkyl having 1 to 3 carbon atoms, alkenyl having 3 or 4 carbon atoms or hydroxyalkyl having 2 to 4 carbon atoms and $Y_1$ and $Y_2$ together with the nitrogen atom are a 5- or 6-membered aliphatic heterocyclic ring, which optionally can contain a further heteroatom and which is unsubstituted or substituted by non-chromophoric substituents, $R_2$ is alkyl having 1 to 8 carbon atoms, alkenyl having 3 or 4 carbon atoms, cyclohexyl, hydroxyalkyl having 2 to 4 carbon atoms, alkoxyalkyl having a total of 3 to 6 carbon atoms, carbalkoxy having 2 to 6 carbon atoms, carbalkoxyalkyl having a total of 3 to 6 carbon atoms, cyanoalkyl having 2 or 3 carbon atoms, benzyl which is unsubstituted or substituted by chlorine, methyl or methoxy, dialkylaminoalkyl having a total of 3 to 7 carbon atoms or phenethyl and, if n is the number 0, also hydrogen, $R_3$ is hydrogen, alkyl having 1 to 6 carbon atoms, hydroxyalkyl having 2 or 3 carbon atoms, cyanoalkyl having 2 or 3 carbon atoms, carboxyalkyl having 2 or 3 carbon atoms, carbamoylalkyl having 2 to 4 carbon atoms, alkoxycarbonylalkyl having a total of 3 to 6 carbon atoms, alkenyl having 3 or 4 carbon atoms or benzyl which is unsubstituted or substituted by chlorine or methyl, $R_4$ is chlorine, bromine, fluorine, carboxyl, carbalkoxy having a total of 2 to 5 carbon atoms, alkoxyalkoxycarbonyl having a total of 4 to 6 carbon atoms, benzyloxycarbonyl, cyano, sulpho, alkylsulphonyl having 1 to 4 carbon atoms, phenylsulphonyl which is unsubstituted or substituted by chlorine or methyl, benzylsulphonyl, sulphonic acid phenyl ester which is unsubstituted or non-chromophoric substituted, or —SO$_2$-NY$_1$Y$_2$ or —CONY$_1$Y$_2$ wherein Y$_1$ and Y$_2$ have the meaning given above, $R_5$ is hydrogen, chlorine, alkylsulphonyl having 1 to 4 carbon atoms, sulpho, methyl, sulphonic acid phenyl ester which is unsubstituted or non-chromophoric substituted or —SO$_2$NY$_1$Y$_2$ wherein Y$_1$ and Y$_2$ have the meaning given above, $R_6$ is hydrogen or chlorine, n is the number 0 or 1 and A$^\ominus$ is a colourless anion.

15. A 2-phenyl-5-benzimidazol-2'-yl-furane according to claim 14 of the formula

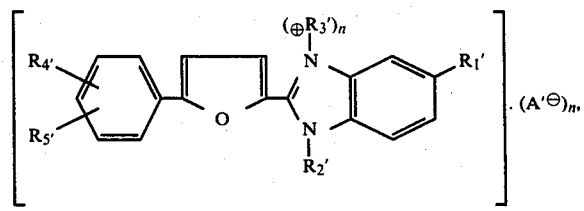

(B)

wherein $R_1'$ is sulpho, sulphonic acid phenyl ester, alkylsulphonyl having 1 to 4 carbon atoms, phenylsulphonyl, benzylsulphonyl, trifluoromethyl, cyano or —SO$_2$-NY$_1'$Y$_2'$ wherein Y$_1'$ is hydrogen, alkyl having 1 to 4 carbon atoms, alkenyl having 3 or 4 carbon atoms, cyclohexyl, alkoxyalkyl having a total of 3 to 6 carbon atoms or benzyl and Y$_2'$ is hydrogen, alkyl having 1 to 3 carbon atoms or alkenyl having 3 or 4 carbon atoms and Y$_1'$ and Y$_2'$ together with the nitrogen atom are a piperidine ring, pyrrolidine ring or a morpholine ring which is unsubstituted or substituted by 2 methyl groups, $R_2'$ is alkyl having 1 to 4 carbon atoms, alkenyl having 3 or 4 carbon atoms, cyclohexyl, alkoxyalkyl having a total of 3 to 6 carbon atoms or benzyl and, if n is the number 0, also hydrogen, $R_3'$ is hydrogen, alkyl having 1 to 4 carbon atoms, hydroxyalkyl having 2 or 3 carbon atoms, alkenyl having 3 or 4 carbon atoms or benzyl, $R_4'$ is chlorine, carbalkoxy having 2 to 5 carbon atoms, cyano, sulpho, alkylsulphonyl having 1 to 4 carbon atoms, phenylsulphonyl, benzylsulphonyl, sulphonic acid phenyl ester or —SO$_2$NY$_1'$Y$_2'$ or —CONY$_1'$Y$_2'$ wherein Y$_1'$ and Y$_2'$ have the meaning given above, $R_5'$ is hydrogen or chlorine, n is the number 0 or 1 and A'$^\ominus$ is halide, formiate acetate, lactate, CH$_3$SO$_4$$^\ominus$, C$_2$H$_5$SO$_4$$^\ominus$, C$_6$H$_5$SO$_3$$^\ominus$, p-CH$_3$-C$_6$H$_4$SO$_3$$^\ominus$, p-Cl-C$_6$H$_4$SO$_3$$^\ominus$, carbonate or bicarbonate.

16. A 2-phenyl-5-benzimidazol-2'-yl-furane according to claim 15 of the formula

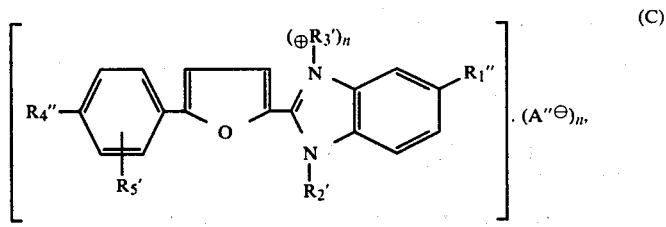

(C)

wherein $R_1''$ is sulphonic acid phenyl ester, alkylsulphonyl having 1 to 4 carbon atoms, phenyl sulfonyl, benzyl sulphonyl, cyano or —SO$_2$NY$_1'$Y$_2'$ wherein Y$_1'$ is hydrogen, alkyl having 1 to 4 carbon atoms, alkenyl having 3 or 4 carbon atoms, cyclohexyl, alkoxyalkyl having a total of 3 to 6 carbon atoms or benzyl, Y$_2'$ is hydrogen, alkyl having 1 to 3 carbon atoms or alkenyl having 3 or 4 carbon atoms and Y$_1'$ and Y$_2'$ together with the nitrogen atom are a piperidine ring, a pyrrolidine ring or a morpholine ring which is unsubstituted or substituted by two methyl groups. $R_2'$ has the meaning given in claim 15, $R_3'$ is hydrogen, alkyl having 1 to 4 carbon atoms, hydroxyalkyl having 2 or 3 carbon atoms, alkenyl having 3 or 4 carbon atoms or benzyl, $R_4''$ is chlorine, carbalkoxy having 2 to 5 carbon atoms, cyano, alkylsulphonyl having 1 to 4 carbon atoms, phenylsulphonyl, benzylsulphonyl, sulphonic acid phenyl ester or —SO$_2$NY$_1'$Y$_2'$ or —CONY$_1'$Y$_2'$ wherein Y$_1'$ and Y$_2'$ have the meaning given above, $R_5'$ is hydrogen or chlorine, n is the number 0 or 1 and A''$^\ominus$ is chloride, bromide, jodide, formiate, acetate, lactate, CH$_3$SO$_4$$^\ominus$, C$_2$H$_5$SO$_4$$^\ominus$, C$_6$H$_5$SO$_3$$^\ominus$, p-CH$_3$-C$_6$H$_4$SO$_3$$^\ominus$, p-Cl-C$_6$H$_4$SO$_3$$^\ominus$, carbonate or bicarbonate.

17. A 2-phenyl-5-benzimidazol-2'-yl-furane according to claim 14 of the formula

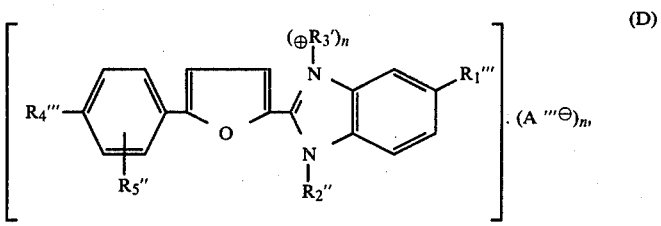
(D)

wherein $R_1'''$ is sulphonic acid phenyl ester, alkylsulphonyl having 1 to 4 carbon atoms, cyano, trifluoromethyl or $-SO_2NY_1''Y_2''$, wherein $Y_1''$ is hydrogen, alkyl having 1 to 4 carbon atoms, alkenyl having 3 or 4 carbon atoms, hydroxyalkyl having 2 to 4 carbon atoms, phenyl or cyclohexyl, $Y_2''$ is hydrogen, alkyl having 1 to 4 carbon atoms or hydroxyalkyl having 2 to 4 carbon atoms, and $Y_1''$ and $Y_2''$ together with the nitrogen atom are the morpholine ring, $R_2''$ is alkyl having 1 to 4 carbon atoms, hydroxyalkyl having 1 to 4 carbon atoms, alkenyl having 3 or 4 carbon atoms, benzyl or cyclohexyl, $R_3''$ is alkyl having 1 to 4 carbon atoms, hydroxyalkyl having 1 to 4 carbon atoms, alkoxycarbonylalkyl having 3 to 6 carbon atoms or benzyl, $R_4'''$ is chlorine, carboxyl, carbalkoxy having 2 to 5 carbon atoms, sulpho, alkylsulphonyl having 1 to 4 carbon atoms, phenylsulphonyl, benzylsulphonyl, cyano, sulphonic acid phenyl ester, carbamoyl or $-SO_2NHY_1'''$ wherein $Y_1'''$ is hydrogen or alkyl having 1 to 4 carbon atoms, $R_5''$ is hydrogen, chlorine or methyl, n is the number 0 or 1 and $A'''^\ominus$ is chloride, bromide, iodide, $CH_3SO_4^\ominus$, $C_2H_5SO_4^\ominus$ or p—$CH_3$—$C_6H_4$—$SO_3^\ominus$.

18. A 2-phenyl-benzimidazol-2'-yl-furane according to claim 14 of the formula

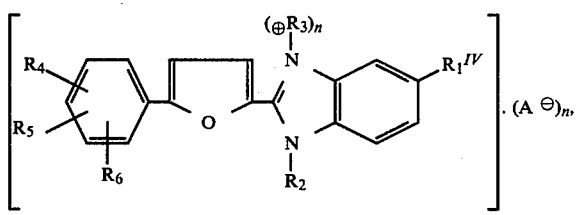
(E)

wherein $R_1'$ is trifluoromethyl or sulphonic acid phenyl ester which is unsubstituted or substituted by one to three alkyl groups having 1 to 4 carbon atoms, chlorine or methoxy, $R_2$ is alkyl having 1 to 8 carbon atoms, alkenyl having 3 or 4 carbon atoms, cyclohexyl, hydroxyalkyl having 2 to 4 carbon atoms, alkoxyalkyl having a total of 3 to 6 carbon atoms, carbalkoxy having 2 to 6 carbon atoms, carbalkoxyalkyl having a total of 3 to 4 carbon atoms, cyanoalkyl having 2 or 3 carbon atoms, benzyl which is unsubstituted or substituted by chlorine, methyl or methoxy, dialkylamino alkyl having a total of 3 to 7 carbon atoms or phenethyl and, if n is the number 0, also hydrogen, $R_3$ is hydrogen, alkyl having 1 to 6 carbon atoms, hydroxyalkyl having 2 or 3 carbon atoms, cyanoalkyl having 2 or 3 carbon atoms, carboxyalkyl having 2 or 3 carbon atoms, carbamoylalkyl having 2 to 4 carbon atoms, alkoxycarbonylalkyl having a total of 3 to 6 carbon atoms, alkenyl having 3 or 4 carbon atoms or benzyl which is unsubstituted or substituted by chlorine or methyl, $R_4$ is chlorine, bromine, fluorine, carboxyl, carbalkoxy having a total of 2 to 5 carbon atoms, alkoxyalkoxycarbonyl having a total of 4 to 6 carbon atoms, benzyloxycarbonyl, cyano, sulpho, alkylsulphonyl having 1 to 4 carbon atoms, sulphonyl which is unsubstituted or substituted by chlorine or methyl, benzylsulphonyl, sulphonic acid phenyl ester which is unsubstituted or non-chromophoric substituted or $-SO_2NY_1Y_2$ or $-CONY_1Y_2$ wherein $Y_1$ and $Y_2$ have the meaning given in claim 14, $R_5$ is hydrogen, chlorine, alkylsulphonyl having 1 to 4 carbon atoms, sulpho, methyl, sulphonic acid phenyl ester which is unsubstituted or non-chromophoric substituted or $-SO_2NY_1Y_2$ wherein $Y_1$ and $Y_2$ have the meaning given in claim 14, $R_6$ is hydrogen or chlorine, n is the number 0 or 1 and $A^\ominus$ is a colourless anion.

* * * * *